United States Patent
Chatterjee et al.

(10) Patent No.: US 12,022,474 B2
(45) Date of Patent: Jun. 25, 2024

(54) FREQUENCY DOMAIN RESOURCE ALLOCATION FOR DOWNLINK (DL) AND UPLINK (UL) IN NEW RADIO (NR)

(71) Applicant: Apple Inc., Cupertino, CA (US)

(72) Inventors: Debdeep Chatterjee, San Jose, CA (US); Sergey Panteleev, Nizhny Novgorod (RU); Hong He, Sunnyvale, CA (US); Gang Xiong, Portland, OR (US); Jeongho Jeon, San Jose, CA (US); Ajit Nimbalker, Fremont, CA (US); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 1164 days.

(21) Appl. No.: 16/616,487

(22) PCT Filed: Jun. 15, 2018

(86) PCT No.: PCT/US2018/037820
§ 371 (c)(1),
(2) Date: Nov. 24, 2019

(87) PCT Pub. No.: WO2018/232284
PCT Pub. Date: Dec. 20, 2018

(65) Prior Publication Data
US 2023/0139455 A1 May 4, 2023

Related U.S. Application Data

(60) Provisional application No. 62/588,253, filed on Nov. 17, 2017, provisional application No. 62/521,239, filed on Jun. 16, 2017.

(51) Int. Cl.
*H04W 72/23* (2023.01)
*H04W 72/0457* (2023.01)

(52) U.S. Cl.
CPC ....... *H04W 72/23* (2023.01); *H04W 72/0457* (2023.01)

(58) Field of Classification Search
CPC .. H04W 72/23; H04W 72/0457; H04W 88/08
See application file for complete search history.

(56) References Cited

U.S. PATENT DOCUMENTS

2012/0087331 A1* 4/2012 Seo ............... H04L 5/0094
370/329
2015/0063231 A1* 3/2015 Seo ............... H04L 5/0044
370/329

(Continued)

FOREIGN PATENT DOCUMENTS

| CN | 103959826 A | 7/2014 |
|----|-------------|--------|
| CN | 104488344 A | 4/2015 |

OTHER PUBLICATIONS

Mpirical Glossry "gNB," Apr. 20, 2017 https://www.mpirical.com/glossary/gnb-next-generation-node-b (Year: 2017).*

(Continued)

*Primary Examiner* — Maharishi V Khirodhar
*Assistant Examiner* — Kenneth P Hunt
(74) *Attorney, Agent, or Firm* — Eschweiler & Potashnik, LLP

(57) ABSTRACT

In one embodiment, an apparatus includes memory storing instructions and processing circuitry coupled to the memory. The processing circuitry is to implement the instructions to select a resource block group (RBG) size configuration from a set of RBG size configurations based on a bandwidth part (BWP) size. Each RBG size configuration is to indicate RBG sizes associated with respective ranges of BWP sizes, and the RBG sizes are to indicate a number of frequency-domain physical resource blocks (PRBs) for physical downlink shared channel (PDSCH) or physical uplink shared channel (PUSCH) transmissions. The processing circuitry is (Continued)

further to implement the instructions to allocate PRBs for communication between the gNB device and a user equipment (UE) device via the PDSCH or PUSCH transmissions based on the selected RBG size, and to encode downlink control information (DCI) that indicates the allocated PRBs for transmission to the UE device.

22 Claims, 13 Drawing Sheets

(56) References Cited

U.S. PATENT DOCUMENTS

| | | |
|---|---|---|
| 2015/0327226 A1 | 11/2015 | Cheng et al. |
| 2016/0183261 A1 | 6/2016 | Koorapaty et al. |
| 2020/0136774 A1* | 4/2020 | Tang ................. H04L 5/0046 |

OTHER PUBLICATIONS

Martin Sauter, "3GPP 5G NR—What's the 'g' in gNB all about—Part 2?" Nov. 25, 2016 https://blog.wirelessmoves.com/2016/11/3gpp-5g-nr-whats-the-g-in-gnb-all-about-part-2.html (Year: 2016).*

Wikipedia, "RF front end" May 28, 2014 https://en.wikipedia.org/wiki/RF_front_end (Year: 2014).*
3GPP TS 38.212 V15.1.1 Apr. 2018 https://panel.castle.cloud/view_spec/38212-f11/ (Year: 2018).*
Ericsson, "On Frequency-Domain and Time-Domain Resource Allocation," R1-1709099, 3GPP TSG RAN WG1 Meeting #89, Hangzhou, China, May 7, 2017 (4 pages).
Huawei et al, "On Uplink Resource Allocation," R1-1708120, 3GPP TSG RAN WG1 Meeting #89, Hangzhou, China, May 6, 2017 (4 pages).
Huawei et al., "Configuration Of Control Resource Set," R1-1706943, 3GPP TSG RAN WG1 Meeting #89, Hangzhou, China, May 8, 2019 (5 pages).
NEC "Frequency and Time Resource Allocation Schemes for NR", R1-1707200, 3GPP TSG RAN WG1 Meeting #89, Hangzhou, China, May 6, 2017 (6 pages).
PCT International Search Report and Written Opinion in PCT International Application Serial No. PCT/US2018/037820 dated Oct. 11, 2018 (11 pages).
Samsung, "DL Resource Allocation Aspect," R1-1708017, 3GPP TSG RAN WG1 Meeting #89, Hangzhou, China, May 6, 2017 (9 pages).
International Preliminary Report on Patentability dated Dec. 26, 2019 for International Application PCT/US2018/037820.

* cited by examiner

| PRB # | BWP size (N) = 1-36 | | BWP size (N) = 37-72 | | BWP size (N) = 73-144 | | BWP size (N) = 145-275 | |
|---|---|---|---|---|---|---|---|---|
| | Config 1 | Config 2 | Config 1 | Config 2 | Config 1 | Config 2 | Config 1 | Config 2 |
| 0 | RBG 00 | RBG 00 | RBG 00 | RBG 00 | RBG 00 | RGB 00 | RGB 00 | RGB 00 |
| 1 | RBG 00 | | | | | | | |
| 2 | RBG 01 | | | | | | | |
| 3 | RBG 01 | | | | | | | |
| 4 | RBG 02 | RBG 01 | RBG 01 | | | | | |
| 5 | RBG 02 | | | | | | | |
| 6 | RBG 03 | | | | | | | |
| 7 | RBG 03 | | | | | | | |
| 8 | RBG 04 | RBG 02 | RBG 02 | RBG 01 | RBG 01 | | | |
| 9 | RBG 04 | | | | | | | |
| 10 | RBG 05 | | | | | | | |
| 11 | RBG 05 | | | | | | | |
| 12 | RBG 06 | RBG 03 | RBG 03 | | | | | |
| 13 | RBG 06 | | | | | | | |
| 14 | RBG 07 | | | | | | | |
| 15 | RBG 07 | | | | | | | |
| 16 | RBG 08 | RBG 04 | RBG 04 | RBG 02 | RBG 02 | | | |
| 17 | RBG 08 | | | | | | | |
| 18 | RBG 09 | | | | | | | |
| 19 | RBG 09 | | | | | | | |
| 20 | RBG 10 | RBG 05 | RBG 05 | | | RGB 01 | RGB 01 | RGB 01 |
| 21 | RBG 10 | | | | | | | |
| 22 | RBG 11 | | | | | | | |
| 23 | RBG 11 | | | | | | | |
| 24 | RBG 12 | RBG 06 | RBG 06 | RBG 03 | RBG 03 | | | |
| 25 | RBG 12 | | | | | | | |
| 26 | RBG 13 | | | | | | | |
| 27 | RBG 13 | | | | | | | |
| 28 | RBG 14 | RBG 07 | RBG 07 | | | | | |
| 29 | RBG 14 | | | | | | | |
| 30 | RBG 15 | | | | | | | |
| 31 | RBG 15 | | | | | | | |

Fig. 11

FREQUENCY DOMAIN RESOURCE ALLOCATION FOR DOWNLINK (DL) AND UPLINK (UL) IN NEW RADIO (NR)

CROSS REFERENCE TO RELATED APPLICATIONS

This application is the National Stage of International Application No. PCT/US2018/037820, filed on Jun. 15, 2018, which claims the benefit of U.S. Provisional Application No. 62/521,239, entitled "Frequency-domain Resource Allocation for Downlink (DL) and Uplink (UL) in New Radio (NR)" and filed on Jun. 16, 2017, and which also claims the benefit of U.S. Provisional Application No. 62/588,253 entitled "Frequency-domain Resource Allocation DL and UL" and filed on Nov. 17, 2017, the entire disclosures of which are incorporated herein by reference.

TECHNICAL FIELD

This disclosure generally relates to New Radio (NR) frequency-domain resource allocation techniques for uplink and downlink transmissions.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third-generation partnership project (3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the eNodeB to the UE via a physical downlink shared channel (PDSCH). A physical downlink control channel (PDCCH) may be used to provide control information regarding a downlink PDSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 11 is a diagram showing example RBGs in BWPs based on different RBG size configurations in accordance with some embodiments;

DETAILED DESCRIPTION

Figure 1:
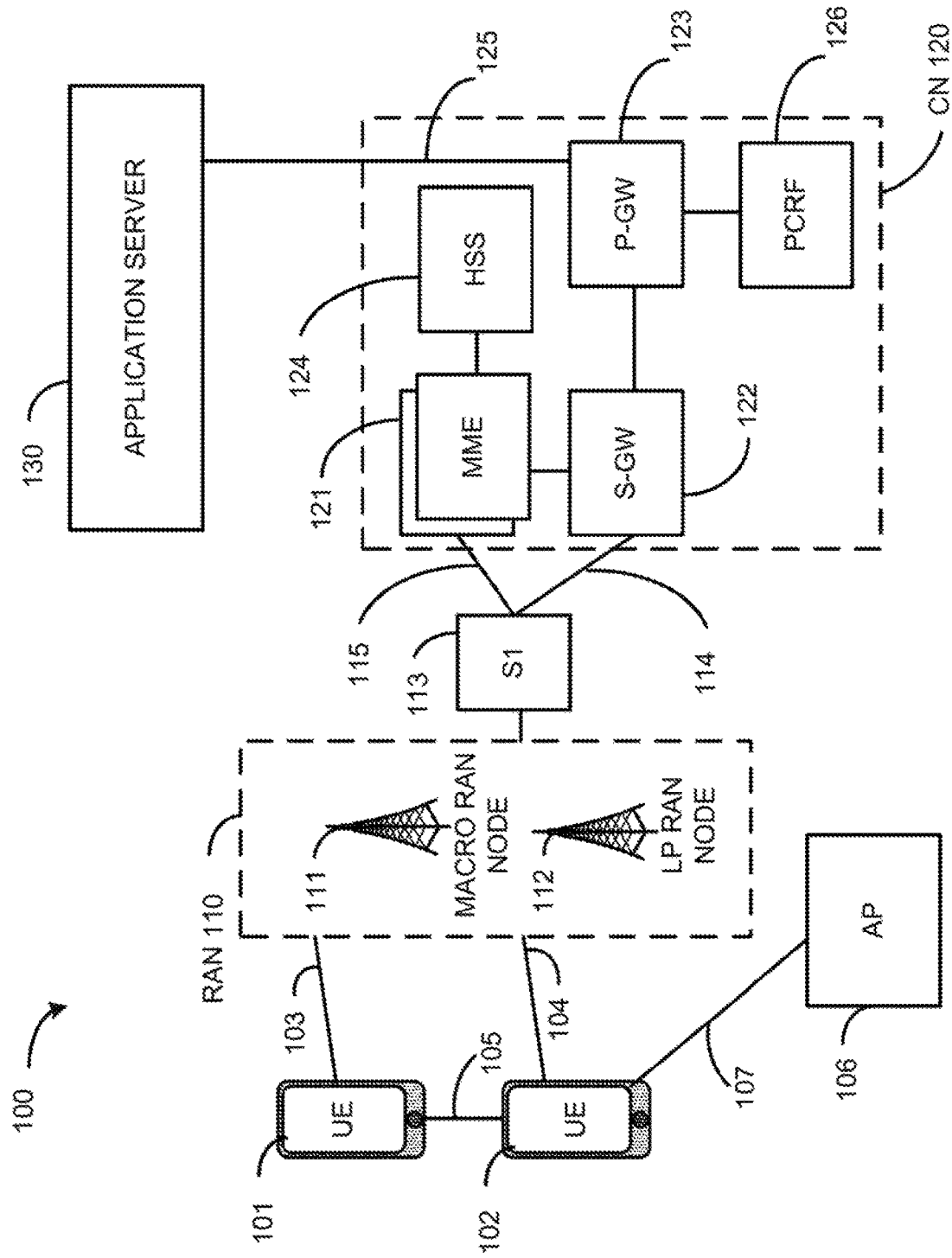
FIG. 1 illustrates an architecture of a system of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platform. The next generation wireless communication system, 5G, or NR will provide access to information and sharing of data anywhere, anytime by various users and applications. NR is expected to be a unified network/system that targets to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simpler and more seamless wireless connectivity solutions. NR will enable everything connected by wireless and deliver fast, rich content and services.

NR supports two basic mechanisms for frequency-domain resource allocation (RA): (1) Resource Block Group (RBG) or bitmap based allocation (referred to as "NR Type 0 RA"), in which particular physical resource blocks (PRBs) are indicated in a bitmap of downlink control information (DCI) sent on a Physical Downlink Control Channel (PDCCH); and (2) Resource Indication Value (RIV) based allocation (referred to as "NR Type 1 RA"), in which a starting PRB and the allocated number of PRBs for a set of contiguous logical (virtual) set of PRBs are indicated in DCI sent on the PDCCH. Resources in the frequency-domain may be allocated within bandwidth parts (BWPs) that can be dynamically switched. BWPs may refer to contiguous sets of PRBs, which may be selected from a contiguous set of common PRBs for a given numerology on a given carrier. In some cases, RIV-based allocation may be used for fallback DCI format for downlink (DL) and uplink (UL) transmissions to realize a compact DCI size (which, in some cases, may lead to reduced scheduling flexibility). In some cases, the fallback DCI format may refer to a DCI format that doesn't include fields indicating resource allocation by higher levels (e.g., non-PHY levels). Fallback DCI formats may refer to DCI formats 0_0 or 1_0 for UL or DL scheduling, respectively, in the NR 3GPP specification. Non-fallback or regular or configurable DCI formats may refer to DCI formats 0_1 or 1_1 for UL or DL scheduling, respectively, in the NR 3GPP specification.

Aspects of the present disclosure describe efficient methods for frequency-domain resource allocation in NR (e.g., RA for PDSCH and PUSCH with cyclic prefix orthogonal frequency division multiplexing (CP-OFDM)) or other wireless communication protocols. For example, in some embodiments, RIV-based (Type 1) RA for DL and UL may be supported, considering fallback use cases and dynamic switching of active DL/UL BWPs for regular or non-fallback DCI formats. As another example, in some embodiments, Type 0 RA and handling of dynamic UL BWP switching may be supported, and characteristics of the two sets of RBG sizes may be specified for Type 0 RA. In some cases, certain advantages may be realized by embodiments of the present disclosure. For example, adaptive RBG sizes may be used, allowing for more efficient scheduling. As another example, dynamic switching between large and small frequency-domain RAs may be realized. Other advantages may be realized by aspects of the present disclosure as well. One or more aspects of the present disclosure may be implemented by the systems, devices, or components shown in FIGS. 1-8 and described further below.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time-domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency-domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
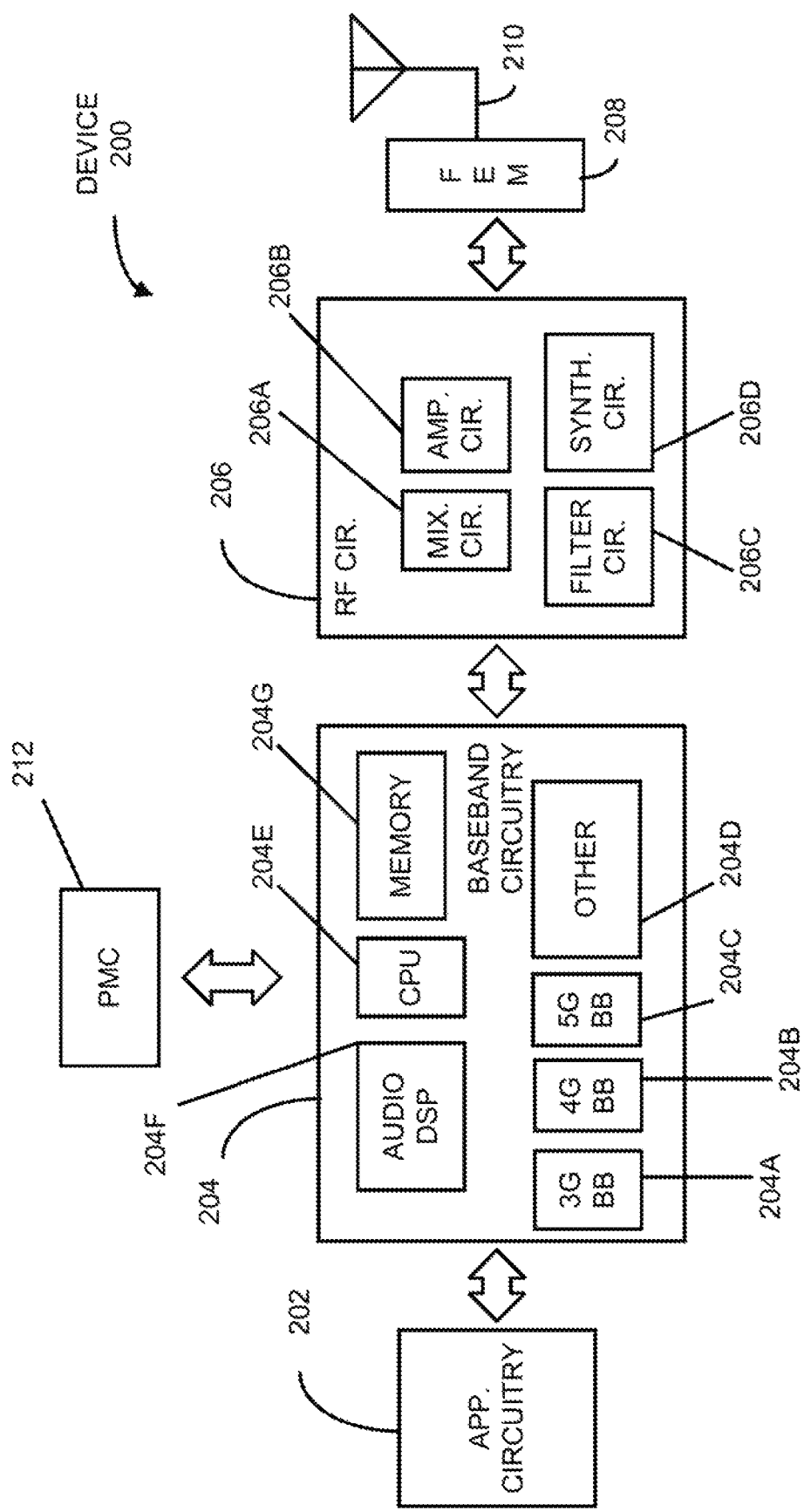
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
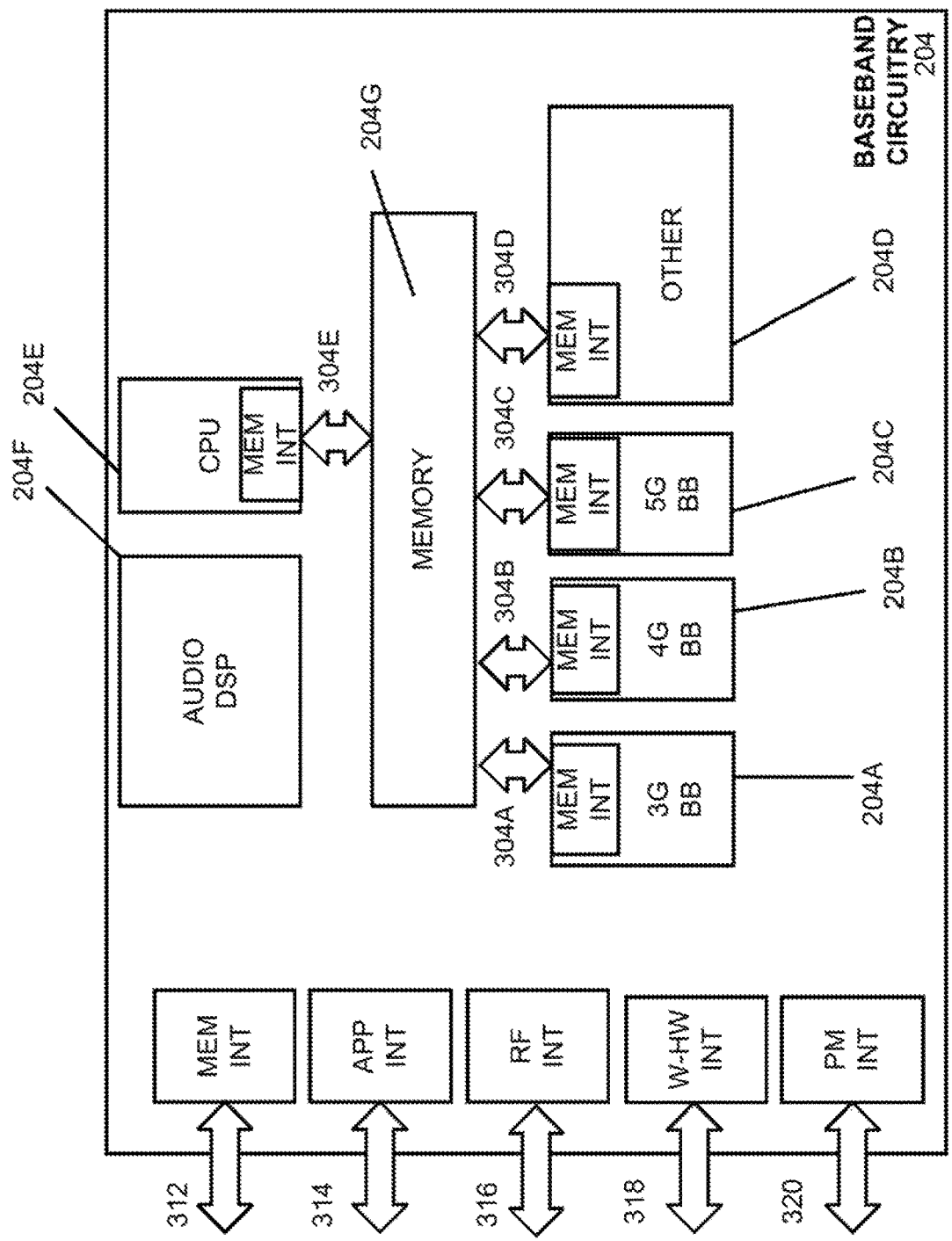
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
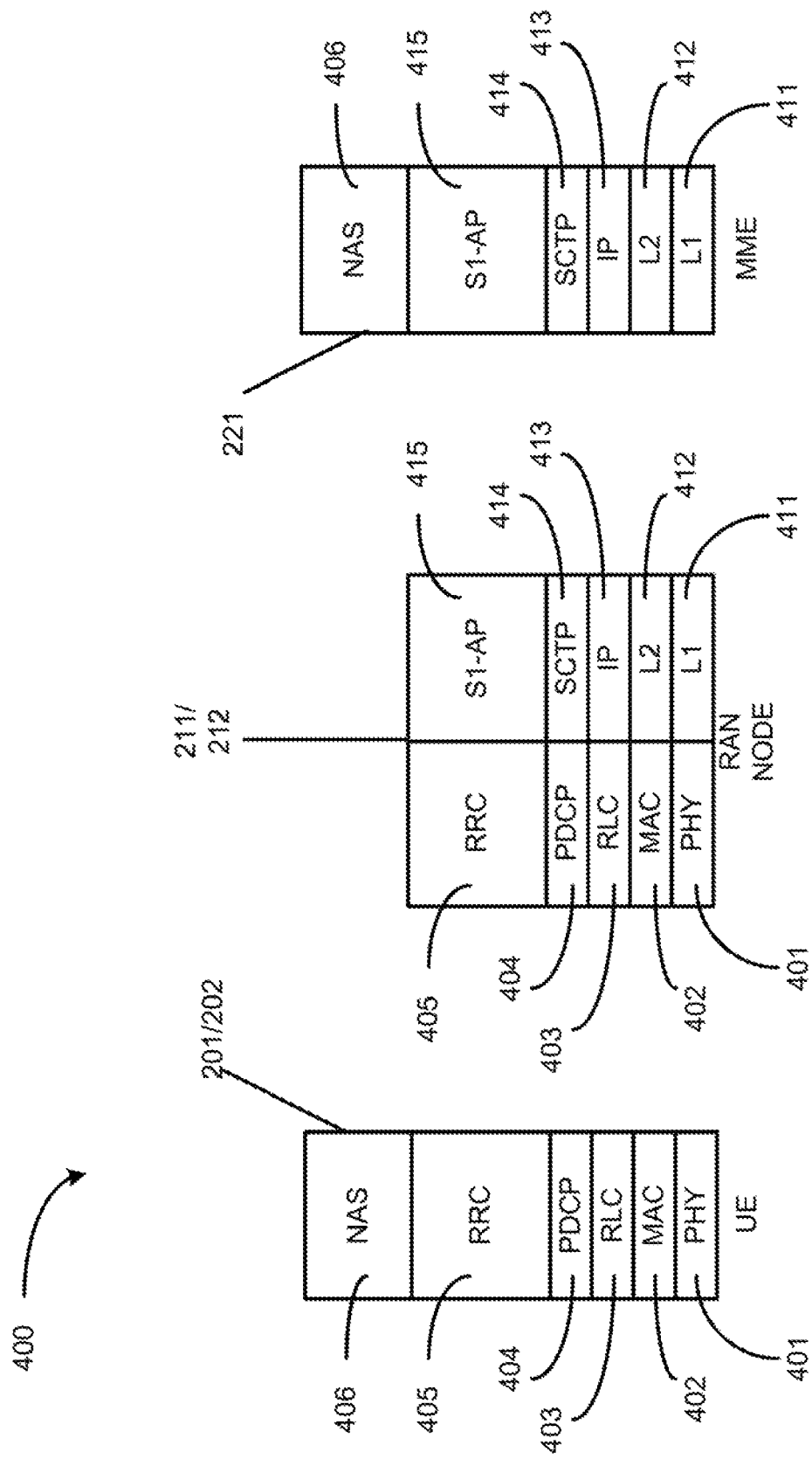
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
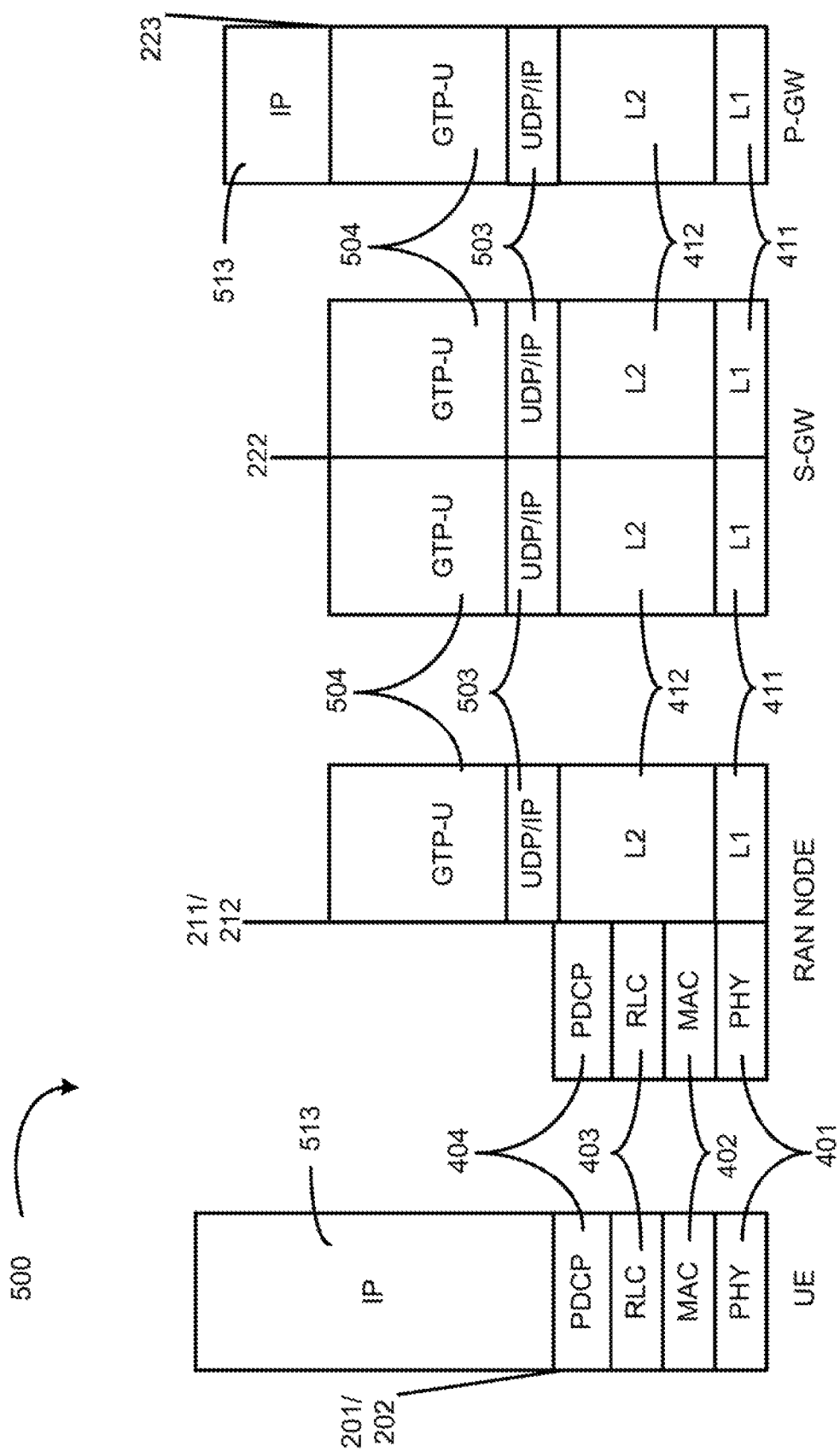
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
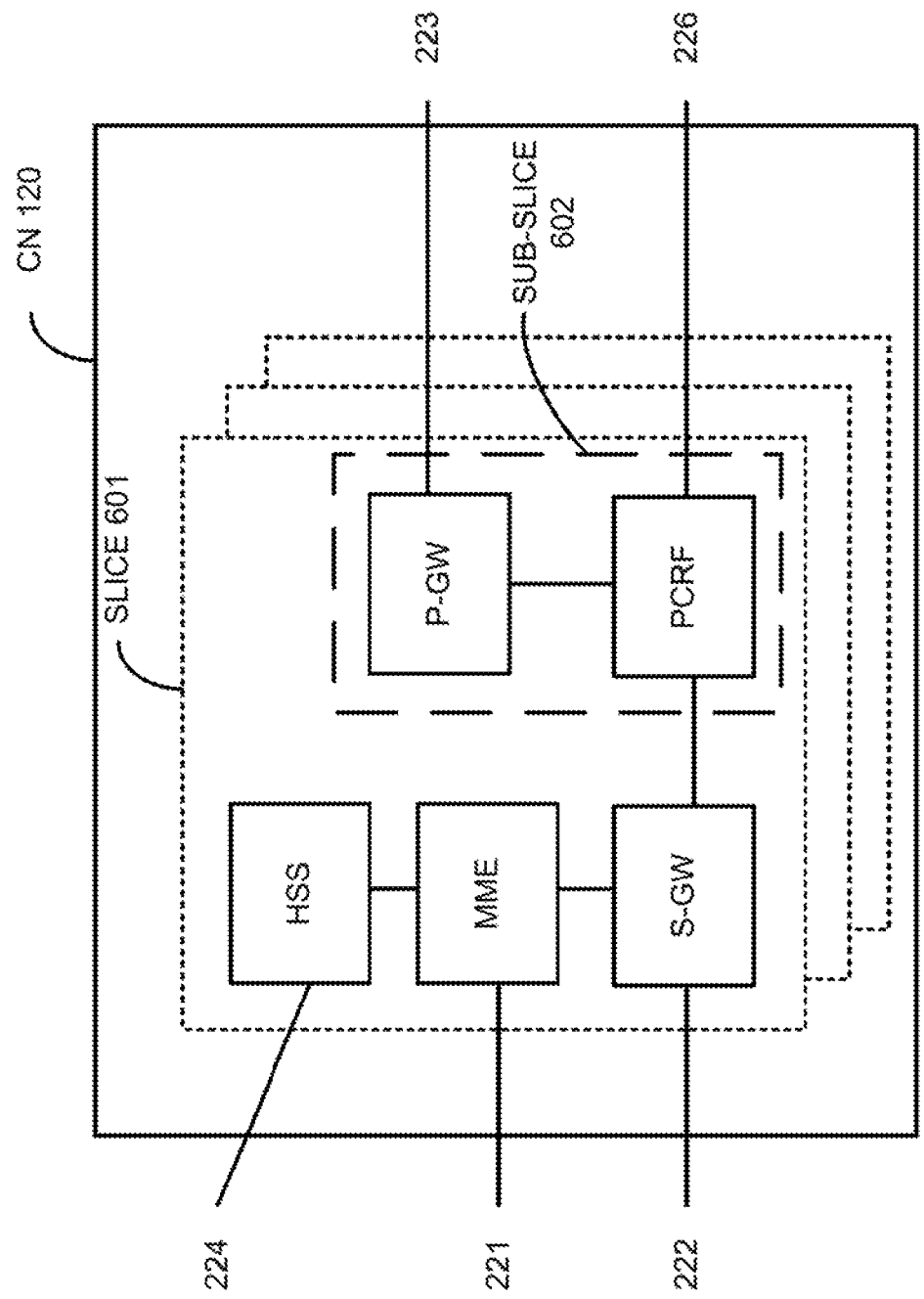
FIG. 6 illustrates components of a core network in accordance with some embodiments.

FIG. 6 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 601. A logical instantiation of a portion of the CN 120 may be referred to as a network sub-slice 602 (e.g., the network sub-slice 602 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
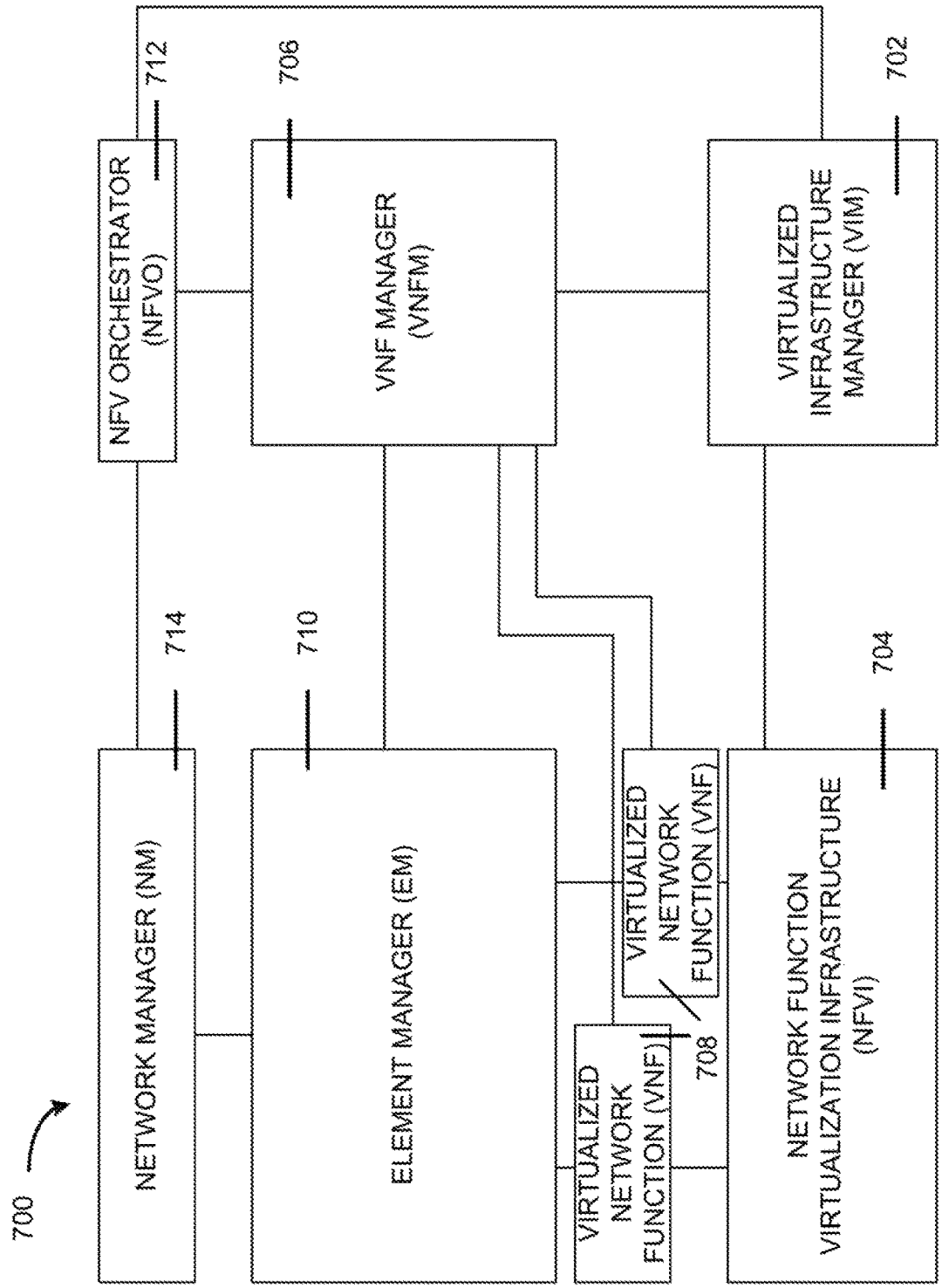
FIG. 7 is a block diagram illustrating components, according to some example embodiments, of a system to support NFV.

FIG. 7 is a block diagram illustrating components, according to some example embodiments, of a system 700 to support NFV. The system 700 is illustrated as including a virtualized infrastructure manager (VIM) 702, a network function virtualization infrastructure (NFVI) 704, a VNF manager (VNFM) 706, virtualized network functions (VNFs) 708, an element manager (EM) 710, an NFV Orchestrator (NFVO) 712, and a network manager (NM) 714.

The VIM 702 manages the resources of the NFVI 704. The NFVI 704 can include physical or virtual resources and applications (including hypervisors) used to execute the system 700. The VIM 702 may manage the life cycle of virtual resources with the NFVI 704 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 706 may manage the VNFs 708. The VNFs 708 may be used to execute EPC components/functions. The VNFM 706 may manage the life cycle of the VNFs 708 and track performance, fault and security of the virtual aspects of VNFs 708. The EM 710 may track the performance, fault and security of the functional aspects of VNFs 708. The tracking data from the VNFM 706 and the EM 710 may comprise, for example, performance measurement (PM) data used by the VIM 702 or the NFVI 704. Both the VNFM 706 and the EM 710 can scale up/down the quantity of VNFs of the system 700.

The NFVO 712 may coordinate, authorize, release and engage resources of the NFVI 704 in order to provide the requested service (e.g., to execute an EPC function, component, or slice). The NM 714 may provide a package of end-user functions with the responsibility for the management of a network, which may include network elements with VNFs, non-virtualized network functions, or both (management of the VNFs may occur via the EM 710).

Figure 8:
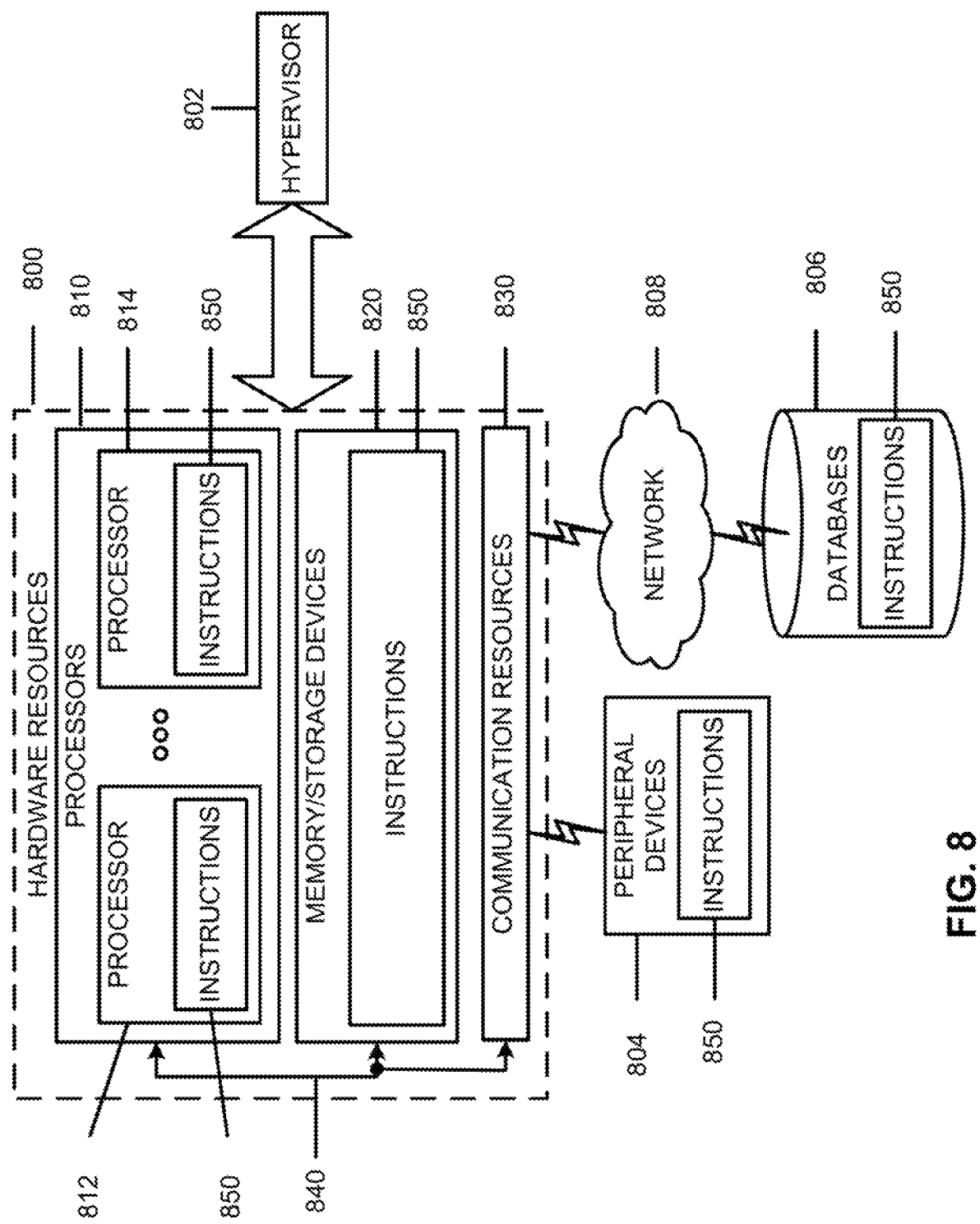
FIG. 8 is a block diagram illustrating components, according to some example embodiments, able to read instructions from a machine-readable or computer-readable medium and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Certain frequency-domain resource allocation (RA) for downlink (DL) and uplink (UL) shared channels (e.g., PDSCH, PUSCH) for NR communications (e.g., communications between a gNB device and UE device) are described herein. In particular embodiments, for example, a frequency-domain RA mechanism allows PDSCH and PUSCH according to CP-OFDM to switch dynamically between a relatively large allocation and a relatively small allocation (e.g., one or few PRBs). For the NR Type 0 RA scheme (which is conceptually similar to LTE Type 0 RA), a Resource Block Group (RBG)-based scheduling may be used, whereby the minimum granularity of frequency-domain RA is in terms of the RBGs.

In LTE, RBG sizes for allocation may be defined as a function of the system BW as in Table 1 below.

TABLE 1

Type 0 resource allocation RBG size vs. Downlink System Bandwidth (Reproduced from Table 7.1.6.1-1 in 3 GPP TS 36.213)

| System Bandwidth $N_{RB}^{DL}$ | RBG Size (P) |
|---|---|
| ≤10 | 1 |
| 11-26 | 2 |
| 27-63 | 3 |
| 64-110 | 4 |

In NR, by comparison, the maximum number of subcarriers within a carrier can be as large as 3300 or 6600 subcarriers, amounting to 275 or 550 PRBs (as one PRB includes 12 subcarriers). Hence, for similar signaling overhead in the scheduling DCI from the frequency-domain RA field, the RBG sizes for carrier bandwidth (BW) or bandwidth part (BWP) with a large number of PRBs can be quite large, especially if 550 PRBs are supported (e.g., in NR Rel-15 or in a future NR Release). Certain embodiments in this disclosure assume a maximum of 6600 subcarriers. However, the number of subcarriers may be different than those described herein, or may be scaled in some manner if a different maximum number of maximum subcarriers is considered. Thus, depending on the chosen number of subcarriers used for the determination of the RBG size, it may not be possible for a NR gNB to schedule a UE, configured with NR RA Type 0 in a relatively large carrier BW or configured BWP, with a smaller allocation on the order of one or few PRBs in a dynamic manner without changing or modifying the resource allocation type.

Accordingly, certain embodiments described herein relate to several methods for frequency-domain resource allocation for PDSCH and PUSCH with CP-OFDM. For example, the present disclosure describes details related to: (1) determination of RBG sizes corresponding to the carrier bandwidth size, configured frequency range, or size of configured or activated BWP; (2) support of adaptive RBG sizes for frequency-domain RA according to NR RA Type 0; and (3) RA mechanisms for PDSCH and PUSCH using CP-OFDM waveforms to enable dynamic switching between relatively large and relatively small allocations.

In some embodiments, the following items may apply for NR frequency-domain RA techniques:
Candidates of the maximum number of subcarriers per NR carrier may be 3300 or 6600 in NR Rel-15
The above may apply to the lowest subcarrier spacing
The set of RBG size includes at least 2, [3,] 4, [6,] 8, 16
Other RBG sizes may be used as well, however
RBG size may depend on the number of symbols for data
For determining RBG size, the following options may be considered
Option 1: RBG size determined by the network channel BW
Necessity of signaling may be considered
Option 2: RBG size is determined by BW for the configured BWP
Necessity of signaling may be considered
Multiple configured BWP may be considered
Option 3: RBG size is configured by network
Sets of configurable RBG sizes may depend on frequency range
Option 4: RBG size is determined by DCI
Signaling details may be considered
In the frequency-domain, for PDSCH and for PUSCH with CP-OFDM waveform, a default or starting point may utilize NR Type 0 RA (which may be conceptually similar to LTE Type 0 RA).
In the frequency-domain, for PUSCH with DFT-s-OFDM waveforms, only contiguous RA may be supported in NR Rel.15.
In the frequency-domain, NR may allow scheduling a PDSCH and PUSCH with CP-OFDM waveforms using either relatively large resource allocation and relatively small resource allocation in dynamic manner (e.g., scheduling a slot with full or almost full bandwidth and scheduling next slot with one or a few PRBs.)
In NR Type 0 RA (which is similar to LTE Type 0 RA), allocable PRBs within the carrier BW, configured frequency range, or activated BWP(s), etc. may be divided into RBGs of size P, with possibly the last RBG containing less than P PRBs. The signaling for the RA may be realized via a bitmap of length ceil(N/P) where N is the number of PRBs within the carrier BW, configured frequency range, or BWP. The function ceil(x) refers to a "ceiling" function, which returns a smallest integer greater than or equal to x.

Figure 9:
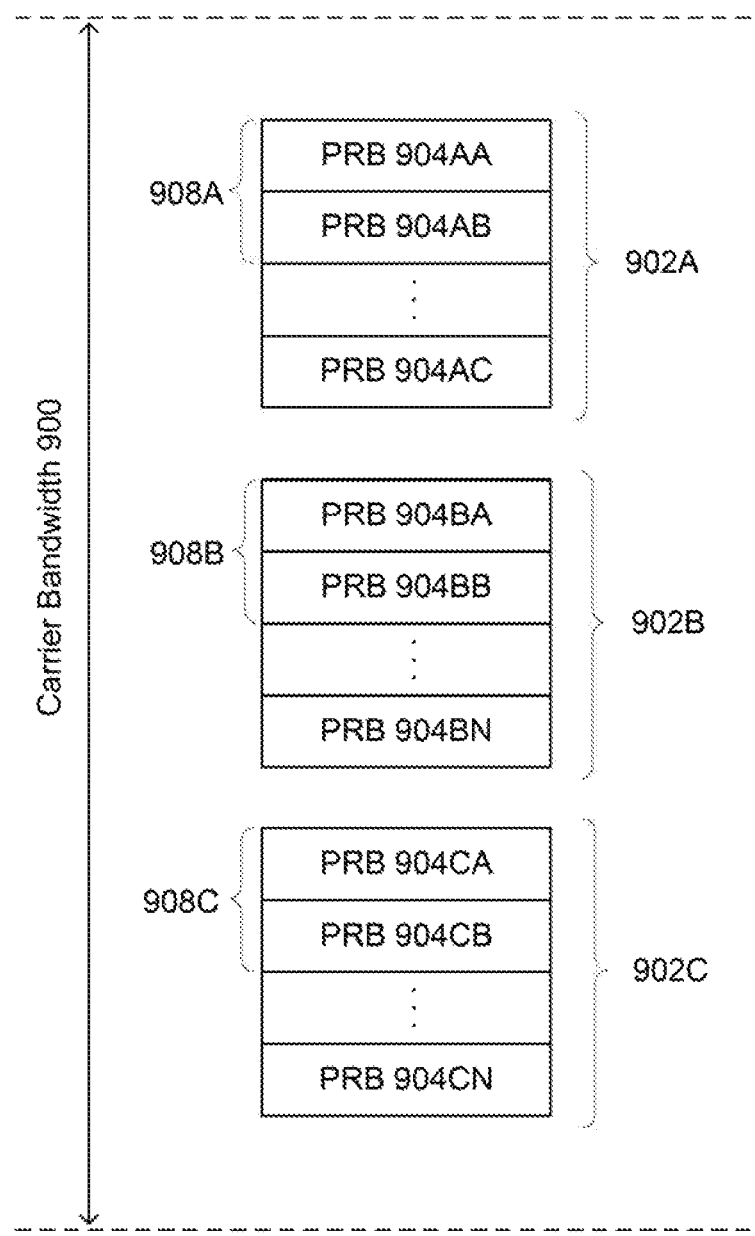
FIG. 9 is a diagram showing example bandwidth parts (BWPs) within a carrier bandwidth in accordance with some embodiments.

FIG. 9 is a diagram showing example BWPs 902 within a carrier bandwidth 900 in accordance with some embodiments. In the example shown, each BWP 902 includes a set of contiguous PRBs 904, and subsets of PRBs 904 within each BWP 902 are grouped into RBGs 908.

Figure 10:
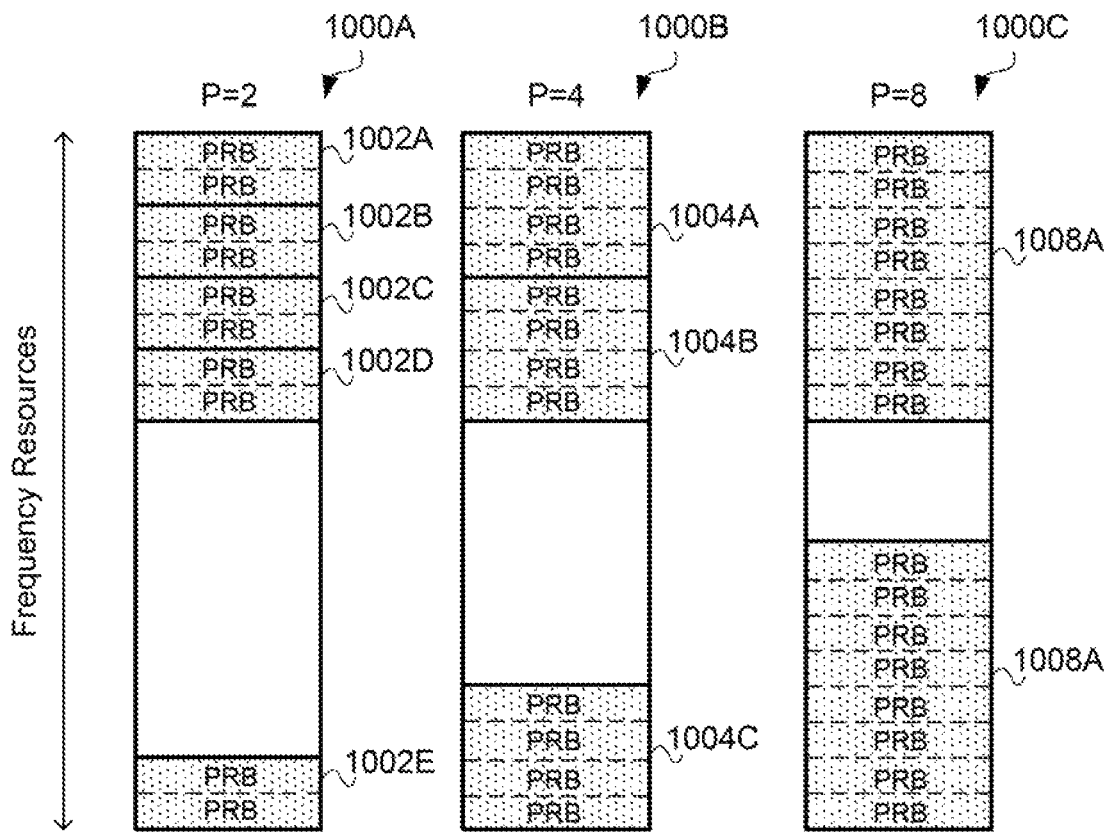
FIG. 10 is a diagram of example frequency-domain allocations in a BWP based on different RBG sizes in accordance with some embodiments.

FIG. 10 is a diagram of example frequency-domain allocations in a BWP 1000 based on different RBG sizes in accordance with some embodiments. In the example shown, the BWP 1000A includes PRB allocations 1002 based on an RBG size of P=2, the BWP 1000B includes PRB allocations 1004 based on an RBG size of P=4, and the BWP 1000C includes PRB allocations 1008 based on an RBG size of P=8.

In some embodiments, an RBG size determination may made during frequency-domain RA. For example, considering Options 1 and 2 above, an RBG size may be given by the network carrier BW, configured frequency range, or BWP size. Assuming a maximum number of subcarriers as 3300 (i.e., 275 PRBs), some example mappings for RBG sizes at least based on the number of PRBs of one component carrier (CC), configured frequency range, or BWP are presented in Tables 2A, 2B, and 2C.

TABLE 2A

NR Type 0 RA RBG size vs. Carrier BW, configured frequency range, or BWP size

| Carrier BW, configured frequency range, or BWP size (N) | RBG Size (P) |
| --- | --- |
| ≤26 | 2 |
| 27-63 | 4 |
| 64-110 | 8 |
| 111-275 | 16 |

TABLE 2B

NR Type 0 RA RBG size vs. Carrier BW, configured frequency range, or BWP size

| Carrier BW, configured frequency range, or BWP size (N) | RBG Size (P) |
| --- | --- |
| ≤26 | 2 |
| 27-63 | 4 |
| 64-138 | 8 |
| 139-275 | 16 |

TABLE 2C

NR Type 0 RA RBG size vs. Carrier BW, configured frequency range, or BWP size

| Carrier BW, configured frequency range, or BWP size (N) | RBG Size (P) |
| --- | --- |
| ≤26 | 2 |
| 27-63 | 4 |
| 64-100 | 6 |
| 101-138 | 8 |
| 139-275 | 16 |

Assuming a maximum number of subcarriers as 6600 (i.e., 550 PRBs), some example mappings for RBG sizes at least based on the number of RBs of one CC or Bandwidth part (BP) are presented in Tables 3A and 3B.

TABLE 3A

NR Type 0 RA RBG size vs. Carrier BW,
configured frequency range, or BWP size

| Carrier BW, configured frequency range, or BWP size (N) | RBG Size (P) |
|---|---|
| ≤26 | 2 |
| 27-63 | 4 |
| 64-110 | 6 |
| 111-250 | 8 |
| 251-550 | 16 |

TABLE 3B

NR Type 0 RA RBG size vs. Carrier BW,
configured frequency range, or BWP size

| Carrier BW, configured frequency range, or BWP size (N) | RBG Size (P) |
|---|---|
| ≤26 | 2 |
| 27-110 | 4 |
| 111-250 | 8 |
| 251-550 | 16 |

Depending on the maximum number of PRBs (which may depend on the maximum number of subcarriers in an NR carrier and the maximum NR carrier BW), the above Tables 2A, 2B, 2C, 3A, 3B can be further extended in a scaled manner or shortened appropriately.

In some embodiments of the present disclosure, a RBG size may be selected from a set of RBG size configurations based on a carrier BW, configured frequency range, or carrier BWP size. Each RBG size configuration may indicate RBG sizes associated with respective ranges of carrier BWP sizes, and the RBG sizes may indicate a number of PRBs for PDSCH or PUSCH transmissions. In some cases, the RBG size configurations may include non-overlapping ranges of carrier BWP sizes and associated RBG sizes. For instance, for a given carrier BW, configured frequency range, or BWP size of less than 'X' PRBs, an RBG size may be selected (e.g., via higher layers) between one of multiple candidates. This may allow for finer trade-off between RA granularity and DCI overhead. In some cases, the value of 'X' may be selected, specified, or configured via higher layers, e.g., via the minimum system information (MSI), remaining minimum system information (RMSI), system information block (SIB) signaling, or dedicated radio resource control (RRC) signaling.

In certain embodiments, two or more sets of RBG size configurations may be utilized. The RBG sizes indicated in the configurations may be based on the number of PRBs in the BWP. UE-specific RRC signaling may be used to configure RA based on the selected one of the two or more sets (see, e.g., Config 1 and Config 2 in Tables 4-6 below). In some cases, at least the lowest BWP range for each RBG size configuration has a common value for RBG size (e.g., RBG size=2). In some cases, both the lowest and highest BWP ranges for each RBG size configuration have a common value for RBG size (e.g., RBG size=16). Further, in some instances, for increased flexibility, a particular RBG size configuration (or RBG size set) can have multiple consecutive rows corresponding to different non-overlapping ranges of BWPs but with the same RBG size. Thus, in the example of Table 4 below, "RBG size 3" and "RBG size 5" can have the same value. Particular examples of BWP ranges and corresponding RBG sizes are shown below in Tables 5-6. It will be understood that the values in Tables 5-6 are merely example values, and variants of these example values are possible without departing from the scope of the present disclosure.

In some embodiments, the choice of the RBG size is configured for transmission of all PDSCH and PUSCH transmissions with CP-OFDM waveforms via the MSI, RMSI, or SIB signaling. Accordingly, the choice of the RBG may be predefined based on the carrier BW or BWP size for transmission of the MSI, RMSI, or SIB signaling, i.e., up until the UE is expected to be indicated with the RBG size.

TABLE 4

RBG size sets

| Carrier BWP Size | Config 1 | Config 2 |
|---|---|---|
| $X_0 - X_1$ RBs | RBG size 1 | RBG size 2 |
| $X_1 + 1 - X_2$ RBs | RBG size 3 | RBG size 4 |
| $X_2 + 1 - X_3$ RBs | RBG size 5 | RBG size 6 |
| ... | ... | ... |
| $X_k + 1 - X_{max}$ RBs | RBG size 11 | RBG size 12 |

TABLE 5

Example of RBG size sets

| Carrier Bandwidth, configured frequency range, or BWP size (N) | RBG Size-Config 1 (P) | RBG Size-Config 2 (P) |
|---|---|---|
| ≤26 | 2 | 2 |
| 27-63 | 4 | 4 |
| 64-110 | 8 | 8 |
| 111-138 | 8 | 16 |
| 139-275 | 16 | 16 |

TABLE 6

Example of RBG size sets

| Carrier BWP Size (N) | RBG Size-Config 1 (P) | RBG Size-Config 2 (P) |
|---|---|---|
| 1-36 | 2 | 4 |
| 37-72 | 4 | 8 |
| 73-144 | 8 | 16 |
| 145-275 | 16 | 16 |

FIG. 11 is a diagram showing example RBGs in BWPs based on different RBG size configurations in accordance with some embodiments. In particular, FIG. 11 shows example RBGs for PRBs 0-31 of a carrier bandwidth using the configurations shown in Table 6 above.

Adaptive RBG size selection can be indicated via dynamic signaling in some embodiments. For instance, in certain embodiments, the selection of which RBG size configuration (and thus, the RBG size for a given BWP size) may be based on a flag value in DCI or other higher layer signaling messages (e.g., RRC messages). For instance, referring to the examples above in Tables 4-6, if the DCI flag=0, then Config 1 may be used to select an RBG size for RA, and if the flag=1, then Config 2 may be used to select an RBG size for RA.

In dynamic indication of the RBG size configuration or RBG size, if the RBG size is reduced, then the bit-width of the frequency-domain RA may not be sufficient to cover the entire carrier BW or frequency range or BWP size. Thus, in certain embodiments, a shift indicator field may be used in the DCI to indicate the set of RBGs that the RA bitmap (in NR Type 0 RA) corresponds to. Accordingly, a one- or two-bit field indicating a shift of the set of RBGs may be used to enable access to all PRBs. For example, the union of the RBG mask (counting from the first PRB of the intended carrier BW, frequency range, or BWP) and the shifted RBG masks may span the carrier BW, frequency range, or BWP size. In other words, one of two to four overlapping RBG masks can be indicated such that the first and the last of these RBG masks include the first and last PRB, respectively, of the carrier BW, frequency range, or BWP. When the flag for RBG size selection indicates the use of the larger RBG size (P) value in a set of RBG size configurations, the shift indicator field may be reserved. The size of the shift indicator field can be determined based on the relative RBG sizes that can be dynamically switched between. In consideration of the additional overhead, in come embodiments, candidate RBG sizes (corresponding to the same BWP size) in two or more RBG size configurations used for dynamic switching may not be different from each other beyond a factor of two.

In some embodiments, the RBG size may be scaled according to the number of symbols allocated in the time-domain for the physical shared channel. Specifically, in one example, the size of RBG can be obtained by increasing the reference RBG size value by a certain factor greater than one, when a number of allocated symbols is less than a certain configured or specified threshold. The factor can be configured by higher layers or predefined in the 3GPP NR specification or determined in accordance with a number of allocated symbols. The number of symbols in the time-domain may be configured by higher layers, and then the gNB and the UE can have the same understanding. In cases that the said number of symbols can change dynamically slot by slot, an indication of the number of symbols in DCI may be used and the size of RBG applied in the slot can be understood based on the indication along with the factor to adjust the size of RBG. In certain embodiments, the RBG size may be at least a function of number of symbols of the NR PDSCH or PUSCH. In some cases, the number of symbols for a NR PDSCH or PUSCH may be indicated by a dedicated field (IE) of DCI format. In some cases, a set of NR PDSCH duration (e.g., expressed in number of symbols) may be configured by higher layers and DCI format may be used to indicate which index of the PDSCH duration out of the duration sets is used.

In some embodiments, a scalable RBG may consist of K consecutive reference RBG in frequency. The size of the reference RBG, denoting as $N_{RBG}^{Ref}$ may be defined in the 3GPP NR specification at least based on a reference CC BW or BWP configuration and a reference number of symbols $N_{symbols}^{Ref}$ corresponding to a subcarrier spacing. In some cases, $N_{symbols}^{Ref}=7$ or 14, depending on the subcarrier spacing (SCS). In some designs, the scalable RBG size K may be determined as follows:

$$K = \lceil N_{symbols}^{Ref}/N_{symbols}^{scheduled} \rceil \cdot N_{RBG}^{Ref}$$

where the $N_{symbols}^{scheduled}$ denotes the number of symbols occupied by the scheduled PDSCH. In some cases, the RBG size K may be explicitly signaled in the DCI format and may be independent of symbols duration of the scheduled NR PDSCH. For instance, a set of candidate RBG sizes may be configured through RRC signaling or fixed in the 3GPP NR specification and one of these values can be dynamically selected and indicated using DCI format to reduce the control signaling overhead. In some cases, the RBG size K and the number of symbols may be combined and indicated via a single field of the DCI, whose value indicates a combination of a RBG size and a number of symbols for the scheduled NR PDSCH.

In implementations with large system BW or BWP sizes, it may be desirable to reduce the DCI overhead when using NR Type 0 RA for PDSCH and PUSCH w/CP-OFDM waveforms or when scheduling of shared channels is performed using compact DCI formats. Accordingly, in some embodiments, the gNB may configure a UE with an additional factor, f>1 (e.g., f=2), to increase the effective RBG size from P to fP. Thus, the combined RBGs, each of size P, may or may not be contiguous in frequency. Such an approach could be used as a counterpart to RA for small BW implementations (e.g., Option 3 detailed below). In some cases, a factor of value greater than one may not apply to RBG size P=16. Conversely, the factor f could be a fraction (e.g., f=½) to reduce the effective RBG size and achieve finer RA granularity at the possible expense of larger DCI overhead. In some cases, a factor of value less than one may not apply to RBG size P=2. The factor f can be provided to the UE via higher-layer signaling, such as, for example, through MSI, RMSI, SIB or dedicated RRC signaling.

Some embodiments may support dynamic switching between large BW and small BW allocations, with a DCI size that does not differ between the two RA methods. In contrast to LTE Type 0 RA, LTE Type 1 RA may allow a UE to be configured with PRB-level allocation by use of a two-stage frequency-domain resource allocation involving RBG subsets and RBGs. Thus, to support of dynamic switching between large bandwidth allocations and narrowband (one or few PRBs) allocations, some embodiments may support both LTE Type 0 and LTE Type 1 RA for PDSCH and PUSCH with CP-OFDM waveforms, with a single additional bit in the DCI acting as a RA type field to indicate the chosen RA type.

In certain embodiments, both LTE Type 0 RA and LTE Type 2 RA (which are conceptually similar to NR Type 0 RA and NR Type 1 RA, respectively) may be supported for PDSCH and PUSCH with CP-OFDM waveforms, using an RA type field in the DCI to switch between the two types, which may include 1 bit (or more if further actions are to be supported). When implementing NR Type 1 RA, a maximum of approximately 18 bits may be sufficient for the RA type field. Accordingly, when frequency-domain allocation is performed using NR Type 1 RA, any remaining bits or states from the RA field can be reserved or used for joint indication of another dynamically signaled parameter.

In some embodiments, to support narrowband resource allocations in NR Type 0 RA smaller than a configured or indicated RBG size, the RA field can be reinterpreted as described in the following Options depending on the indication via the RA type header field in the DCI.

Under Option 1, a number, ceil(log$_2$(ceil(N/P))), of bits (e.g., LSB or MSB) may be used to indicate one of the ceil(N/P) RBGs, and the subsequent ceil(log$_2$(P*(P+1)/2)) bits are used to indicate the PRBs allocated with the indicated RBG of size P PRBs following a mechanism similar to LTE Type 2 RA or NR Type 1 RA. Any remaining bits from the original RA field corresponding to NR Type 0 RA (depending on the carrier BW or BWP size) may be reserved or used for jointly indicating any other dynamic signaling. For the indication of a single RBG, the maximum number of necessary bits may correspond to the case of maximum possible value of N (e.g., 275 or 550 PRBs), and the corresponding P values to support scheduling over N=275 or 550 PRBs may be 16, leading to a maximum number of bits to indicate one RBG as ceil(log 2(ceil(N/P)))=5 or 6 bits. For example, assuming P=16, a maximum of ceil($\log_2$(P*(P+1)/2))=8 bits are needed to indicate an allocation less than or equal to an RBG. The particular combination of N and P values here are for illustrative purpose and the invention can apply generally to any combination of N and P values. Following the above, it can be shown that the above RA mechanism for allocation of PRBs smaller than the configured/determined RBG size will consume no more bits than the corresponding NR Type 0 RA mechanism for the corresponding RBG size.

Under Option 2, a number, ceil(log 2(ceil(N/P))), of bits (e.g., LSB or MSB) may be used to indicate one of the ceil(N/P) RBGs, and the subsequent P bits may be used as a bitmap to indicate the PRBs allocated with the indicated RBG of size P PRBs. Any remaining bits from the original RA field corresponding to NR Type 0 RA (depending on the carrier BW or BWP size) may be reserved or used for jointly indicating any other dynamic signaling. Compared to Option 1, Option 2 may provide additional flexibility of scheduling any set of P PRBs within a RBG as against the contiguous PRB allocation possible with Option 1.

Under Option 3, the RBGs may be further grouped by grouping of 'x' contiguous or non-contiguous RBGs, and a bitmap of length ceil(ceil(N/P)/x) may be used to indicate a set of allocated RBG sets. The PRBs within each RBG set can be indicated in LTE Type 2 RA or NR Type 1 RA using ceil($\log_2$(xP*(xP+1)/2) bits. The value of 'x' can either be specified (e.g., x=2) or configured via higher layer signaling. Such a RA scheme may allow for fine granularity of RA ranging from 1 PRB to xP PRBs with the constraint of same allocation in the indicated RBG set.

For RA using a compact DCI format, aspects (e.g., the first two concepts) of RA Options 1 or 2 can be used to minimize the resource allocation DCI field size. For resource allocation for PUSCH with DFT-S-OFDM, LTE Type 0 RA or NR Type 0 RA can be used.

For both DL and UL and for a UE configured with one or more BWPs, the above RA techniques can be applied within the BWP configured to the UE via higher layers (RRC or MAC CE) or as indicated via the scheduling DCI itself. In one embodiment, for scheduling a UE with an allocation spanning multiple non-overlapping BWPs, the RA may be indicated using an RBG size corresponding to the sum of the PRBs corresponding to the aggregated BWPs. In another embodiment, for scheduling a UE with an allocation spanning multiple overlapping (partially or one completely including the other) BWPs, the RA may be indicated using an RBG size corresponding to the bandwidth of the union of the span of these multiple BWPs. In another embodiment, for scheduling a UE with an allocation spanning multiple non-overlapping or overlapping BWPs, different DC's may be used to schedule the respective transport blocks (TBs) corresponding to same or different numerologies. In such a case, the frequency-domain resource allocation can still use the RBG size corresponding to the respective BWP.

Figure 12:
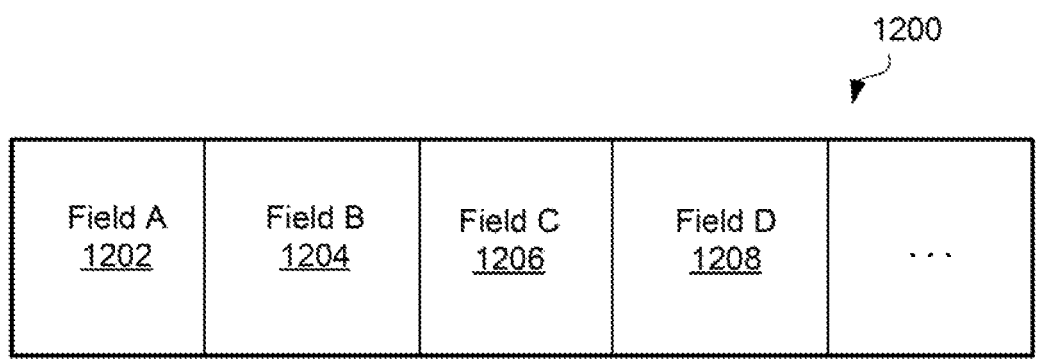
FIG. 12 is a diagram of example resource allocation (RA) information that includes multiple RA fields in accordance with some embodiments.

FIG. 12 is a diagram of example resource allocation (RA) information 1200 that includes multiple RA fields 1202, 1204, 1206, 1208 in accordance with some embodiments. In some instances, the RA information 1200 may be included in DCI or may be signaled in higher layers. In some cases, the RA fields 1202, 1204, 1206, 1208 may be implemented as bit fields of DCI. Each of the RA fields 1202, 1204, 1206, 1208 shown may be fields of different types (denoted by Field A, B, C, D, and so on).

In some cases, Field A 1202 may indicate a type of resource allocation such as RBG based allocation or start PRB-length (or similar type of information). Field B 1204 may indicate the RBG size (e.g. in case Field A 1202 indicates an RBG based allocation), and Field C 1206 can indicate a bitmap (or similar type of information) indicating which RBGs are assigned. In another example, Field B 1204 may indicate a BWP, and Field C 1206 may indicate an RBG size associated with the frequency resources in the BWP, and Field D 1208 may contain the bitmap (or similar type of information) indicating which RBGs are assigned.

In certain other embodiments, the RA field may be interpreted differently depending on the situation. For example, in some cases, a RA field (and/or RBG size) may be configured separately for cell-common messages, group of UEs, or UE-specific messages (e.g., a first RBG size may be configured for a first set of messages, and a second RBG size may be configured for a second set of messages). In some cases, a RA field (and/or RBG size) may be configured on a per-Control resource set (CORESET) basis (e.g. a first RBG size may be configured for message scheduled a first CORESET, and a second RBG size may be configured for messages scheduled via a second CORESET). In some cases, a RA field (and/or RBG size) may be configured on a per-DCI information type basis (e.g. a first RBG size may be configured for a first DCI type, and a second RBG size may be configured for a second DCI type).

In some embodiments, the allocation of RBG size may be made by scaling carrier BW, configured frequency range, or BWP. For example, a field (e.g., Field B 1204 of FIG. 12) within the RA information may be used to determine the scaling (e.g., fraction of N to be used as the RBG size). In some cases, another field of the RA information may indicate the actual RBG used for allocation. Table 7 shows example field values corresponding to different scaling factors for the RBG size (P) based on the carrier BW, configured frequency range, or BWP size (N).

TABLE 7

Example RA Field Values and Corresponding RBG Size

| Field Value | RBG Size (P) as function of carrier BW, configured frequency range, or BWP (N) |
| --- | --- |
| 00 | N/2 |
| 01 | N/4 |
| 10 | N/8 |
| 11 | N/16 |

In the example shown in Table 7, if the field value (e.g., for Field B 1204) is indicated as 00, then there could be only two allocations in the frequency range, 1 to N/2, or N/2 to N, implying that the additional field (e.g., Field C 1206) could be just 1 bit. In this case the resource allocation field is 1+2+1=4 bits total. The remaining bits of resource allocation (if they exist) could be used for indicating other information such as Modulation and coding scheme, redundancy version, etc. For very large transport blocks corresponding to very large frequency allocations, the resource allocation could be jointly coded with other fields in the downlink control information such as Code block group indication, MCS, redundancy version, etc. In some embodiments, Field A 1202, Field B 1204, Field C 1206, or Field D 1208 may be jointly coded to reduce a number of resource allocation fields in the RA information 1200.

In certain embodiments, for PUSCH resource allocation with DFT-S-OFDM waveforms, LTE UL Type 0 RA (or equivalently, LTE DL RA type 2) can be used. Further, in some embodiments, the resource allocation for data channels (e.g., PDSCH or PUSCH) may overlap with the resource allocation for control channel (e.g., PUCCH or PUCCH). This may be the case for the same or other UEs, in either same OFDM symbol or in other OFDM symbols. When the data channel and control channel allocations overlap, the UE may derive its overall resource allocation, by taking into account the explicit or implicit indications from the gNB such as received control channel(s), control resource set, higher layer indications, or other information.

In some embodiments, NR Type 0 RA may be used for scheduling of PDSCH/PUSCH in non-fallback cases when the allocation is for UE(s) in RRC connected mode. In such cases, NR Type 1 RA may be used for scheduling of all common control messages in DL and Msg3 retransmission scheduling for UL (irrespective of the UL waveform used).

For UL NR Type 0 RA and dynamic UL BWP switching, the size of the Type 0 RA bitmap can be semi-statically configured, or the Type 0 RA bitmap size can be determined based on the last active UL BWP. If a BWP switching indication is in the DCI, the resource allocation may be performed using a scaled version of the RBG value used for the latest active UL BWP. In some cases, the scaling may be followed by any necessary rounding up to result in RBG sizes that are configured by the gNB.

Furthermore, in some embodiments, RIV-based RA (NR Type 1 RA) may be implemented in fallback DCI formats for DL and UL, which may realize compact DCI sizes. In certain embodiments, dynamic switching of active DL/UL BWPs may be implemented using regular, non-fallback DCI formats. Some embodiments may support NR Type 0 RA and handling of dynamic UL BWP switching and characteristics of the two RBG size configurations to be specified for NR Type 0 RA.

NR Type 1 RA and Fallback DCI

To simplify the design of fallback DCI, in some embodiments, fallback DCI formats do not support dynamic switching of active DL/UL BWP based on information in the scheduling (fallback) DCI. Thus, fallback DL DCI formats can assign PDSCH resources only in the active DL BWP in which the DCI is detected. Additionally, in some embodiments, for fallback UL DCI formats, the allocated PUSCH resources can be limited to the initial or default active UL BWP. Alternatively, in some embodiments, the fallback UL DCI can be restricted to allocate PUSCH resources in the latest activated UL BWP.

In certain embodiments, the NR Type 1 RA bit-field can be of length corresponding to number of PRBs in the default/initial DL or UL BWP. Alternatively, in some cases, the bit-width for the NR Type 1 RA bit-field in fallback DCI format can be configured using system information, i.e., using MSI/RMSI/OSI. This might not be reconfigurable due to the need for fallback functionality. To enable easier size-matching between DL and UL fallback DCI formats, in some embodiments, the size of the NR Type 1 RA bit-field corresponds to the number of PRBs for the larger of the DL and UL default/initial BWPs. Consequently, if fallback DCI is used to schedule a UE in a BWP with size different from that of the initial or default DL/UL BWP or different from the corresponding configured bitmap, some mapping from the RA bit-field to the resources in the active DL/UL BWP may be defined. In certain embodiments, fallback DCI formats can support dynamic BWP switching. In such instances, the descriptions for Cases A1 and A2 below can still apply with the PDSCH/PUSCH resources being allocated in the BWP indicated in the DCI.

Some embodiments may implement one or more of the following techniques for NR Type 1 RA using fallback DCI formats:

§ Case A1: BW of initial active BWP<=BW of BWP with allocated resources:

Option 1: The RIV based allocation is restricted to certain regions, i.e., specified subset of PRBs (e.g., lowest or highest M PRBs, where M PRBs=BW of default/initial DL/UL BWP) within the active DL/UL BWP Option 2: In addition to Option 1, the RA field includes a shift or offset indicator (1 to m bits) to up to two or 2/\m (m likely no more than 2) regions that are defined such that the lowest and highest PRBs of the larger BWP correspond to the lowest and highest (respectively) PRBs of the first and last region, and any intermediate regions are uniformly placed between the first and last region. Depending on the relative sizes between BWPs, these regions may overlap or not.

This offset/shift bit(s) is/are reserved for Case A2

System information (RMSI/OSI) can be used to configure the bit-width of this shift/offset indicator Option 3: The PRB range covers the whole current BWP but the maximum schedulable BW in terms of PRBs may be restricted to only a fraction of BWP. This is similar to the approach when RIV field is reduced when hopping bits are taken out.

Option 4: In some other designs, the resource allocation field in DCI format may include a resource indication value (RIV) corresponding to a starting RB and a length in terms of contiguously allocated group of blocks ($L_{CRB}$). More particularly, the $L_{CRB}$ may be selected based on a function of the ratio between BW of initial BWP and the target BWP. Also, the last contiguously allocated RB group (RBG) may be spanned in order to cover the whole bandwidth of target BWP. In some other designs, the $L_{CRB}$ is determined based on the BW of target BWP and additionally zero bits padding may be applied to match the DCI format size.

§ Case A2: BW of initial active BWP>BW of BWP with allocated resources:

Certain specified subset of length N bits (e.g., first or last N bits of the resource allocation part of the RA bit field) of the RA bit-field is used where N=ceil(log_2 (N_RB* (N_RB+1)/2)) and N_RB is the number of PRBs in the current active DL/UL BWP NR Type 1 RA and Dynamic BWP Switching For regular, or non-fallback, DCI that can schedule cross-BWP or otherwise enable dynamic switching of active BWPs, NR Type 1 RA can be used. Cross-BWP scheduling w/o changing the size of the RA bit-field may thus be enabled. In certain embodiments, the DCI field ordering may be such that the UE can determine the BWP index or BWP indicator field first, and can thereby know the size of the BWP with PDSCH/PUSCH scheduling.

Some embodiments may implement one or more of the following techniques for NR Type 1 RA using non-fallback DCI formats:

§ Case B1: BW of BWP with allocated PDSCH>BW of current (where UE finds DCI) active BWP Option 1: The RIV based allocation is restricted to certain regions, i.e., specified subset of PRBs (e.g., lowest or highest M PRBs, where M PRBs=BW of scheduling DL/UL BWP) within the DL/UL BWP with PDSCH/PUSCH allocation Option 2: In addition to Option 1, the RA field includes a shift or offset indicator (1 to m bits) to up to two or 2^m (m likely no more than 2) regions that are defined such that the lowest and highest PRBs of the larger BWP correspond to the lowest and highest (respectively) PRBs of the first and last region, and any intermediate regions are uniformly placed between the first and last region. Depending on the relative sizes between BWPs, these regions may overlap or not.

This offset/shift field is reserved for Case B2

System information (RMSI/OSI) can be used to configure the bit-width of this shift/offset indicator Option 3: The PRB range covers the whole current BWP but the maximum schedulable BW in terms of PRBs may be restricted to only a fraction of BWP. This is similar to the approach when RIV field is reduced when hopping bits are taken out.

Option 4: In some other designs, the resource allocation field in DCI format may include a resource indication value (RIV) corresponding to a starting RB and a length in terms of contiguously allocated group of blocks ($L_{CRB}$). More particularly, the $L_{CRB}$ may be selected based on a function of the ratio between BW of initial BWP and the target BWP. Also, the last contiguously allocated RB group (RBG) may be spanned in order to cover the whole bandwidth of target BWP. In some other designs, the $L_{CRB}$ is determined based on the BW of target BWP and additionally zero bits padding may be applied to match the DCI format size.

§ Case B2: BW of BWP with allocated PDSCH<=BW of current (where UE finds DCI) active BWP Certain specified subset of length N bits (e.g., first or last N bits of the resource allocation part of the RA bit field) of the RA bit-field is used where N=ceil(log_2 (N_RB* (N_RB+1)/2)) and N_RB is the number of PRBs in the BWP with allocated PDSCH/PUSCH In embodiments implementing regular/non-fallback DCI in UL scheduling, NR Type 1 RA may support dynamic switching of BWPs. The following embodiments can apply to both DL and UL DCI formats.

In some embodiments, semi-statically configured bit-width of the NR Type 1 RA field for "regular" DCI may be defined. A common configured bit-width may be applied for both DL and UL DCI RA field. Further, a default bit-width may be defined to correspond to the larger of initial DL/UL BWP.

In other embodiments, the bit-width of the NR Type 1 RA field may be implicitly determined based on size of largest configured DL and UL BWP for regular DL and UL DCI, respectively, or based on the size of the largest configured DL or UL BWP (i.e., over the set of all DL and UL BWPs). The latter option may reduce the need for addition of padding bits for size-matching of DL and UL DCI formats.

In other embodiments, the size of the bit-width of the NR Type 1 RA field may be defined based on the number of PRBs corresponding to the span of all configured DL and/or UL BWPs.

In other embodiments, for both DL and UL cases with NR Type 1 RA, the RA bit-field may be defined such that it covers the maximum possible span of all BWPs, which can correspond to either 275 or 550 PRBs in some instances. Accordingly, the RIV-based resource allocation can cover any resource within any configured BWP, and based on the allocated resources, the UE can determine the BWP.

Further, in some embodiments, a BWP index or BWP indicator field may not be present in the DCI (e.g., with one or more of the approaches above). However, in case of configured BWPs that are nested or have overlaps, there can be ambiguity in the determining the intended BWP for allocated resources if the resources are part of multiple BWPs. To resolve this ambiguity, the BWP indicator field can still be carried in the DCI.

Figure 13:
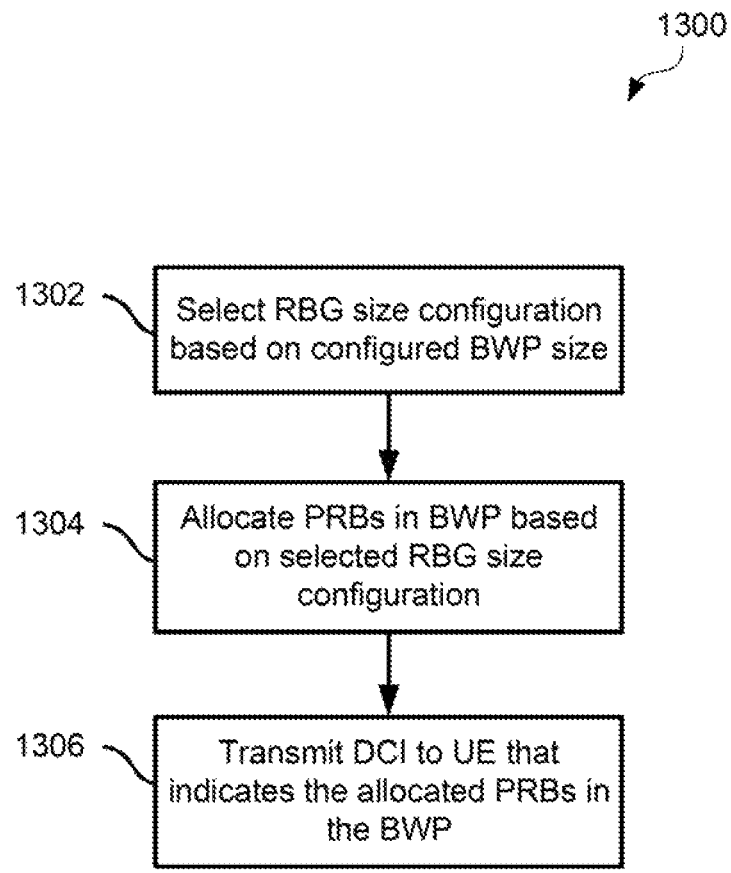
FIG. 13 is a flow diagram showing an example process of allocating frequency-domain resources in a wireless communication system in accordance with some embodiments.

FIG. 13 is a flow diagram showing an example process 1300 of allocating frequency-domain resources in a wireless communication system. Operations in the example process 1300 may be performed by one or more components of a RAN node (e.g., one or more components the baseband circuitry 204 of FIG. 2), and, in certain cases, may be encoded in computer-readable media as instructions executable by processing circuitry of at least one processor. The example process 1300 may include additional or different operations, and the operations may be performed in the order shown or in another order. In some cases, one or more of the operations shown in FIG. 13 are implemented as processes that include multiple operations, sub-processes, or other types of routines. In some cases, operations can be combined, performed in another order, performed in parallel, iterated, or otherwise repeated or performed another manner.

At 1302, a resource block group (RBG) size configuration is selected from a set of RBG size configurations based on a bandwidth part (BWP) size. Each RBG size configuration may indicate RBG sizes associated with respective ranges of BWP sizes, with the RBG sizes indicating a number of frequency-domain physical resource blocks (PRBs) for physical downlink shared channel (PDSCH) or physical uplink shared channel (PUSCH) transmissions. The RBG size configurations may include non-overlapping ranges of BWP sizes. In some cases, a first RBG size associated with a first range of BWP sizes in a first RBG size configuration is equal to a second RBG size associated with a second range of BWP sizes in the first RBG size configurations. In some cases, a first RBG size associated with a highest range of BWP sizes in a first RBG size configuration is equal to a second RBG size associated with the highest range of BWP sizes in a second RBG size configurations.

At 1304, PRBs are allocated for communication between the gNB device and a user equipment (UE) device via the PDSCH or PUSCH transmissions based on the selected RBG size. In some cases, this may include allocating PRBs for PDSCH and PUSCH that overlap with PRBs allocated for via physical downlink control channel (PDCCH) or physical uplink control channel (PUCCH) transmissions, respectively. In some cases, this may include allocating the PRBs according to NR Type 1 for PUSCH transmissions between the gNB and the UE device using Discrete Fourier Transform-Spread-Orthogonal Frequency Division Multiplexing (DFT-S-OFDM).

At 1306, downlink control information (DCI) that indicates the allocated PRBs is transmitted to the UE device. In some cases, RRC message indicating the selected RBG size configuration may be transmitted to the UE device as well. Before transmitting the RRC message, the gNB device may communicate with the UE based on a default RBG size configuration. In some cases, the DCI may also indicate a number of symbols for the PDSCH/PUSCH transmissions.

In some embodiments, the DCI includes a header bit in the resource allocation (RA) field indicating whether frequency-domain allocation of PRBs for the PDSCH or PUSCH transmissions is to be according to NR Type 0 RA or NR Type 1 RA. For example, the RA field may indicate NR Type 0 RA, and the DCI may further include an RBG size field indicating the selected RBG size. A bitmap of the RA field may indicate which RBGs are assigned for the PDSCH/PUSCH transmissions. As another example, the RA field may indicate NR Type 0 RA and the DCI may further include one or more of: a BWP field indicating a particular BWP, an RBG size field indicating an RBG size associated with the frequency resources in the particular BWP, and a bitmap in the RA field indicating which RBGs are assigned for the PDSCH or PUSCH transmissions. As another example, the RA field indicates NR Type 1 RA and is of a length corresponding to a number of PRBs in the BWP. The length may be based on the maximum of ceil(log_2 (N_RB* (N_RB+1)/2)) and ceil(N_RB/RBG size), where N_RB is the number of PRBs in the BWP and RBG size is the corresponding RBG size for NR Type 0 RA.

In some embodiments, a PDSCH duration is selected from a set of durations that are configured to the UE device based on radio resource control (RRC) messages, and the DCI further indicates the selected PDSCH duration.

Figure 14:
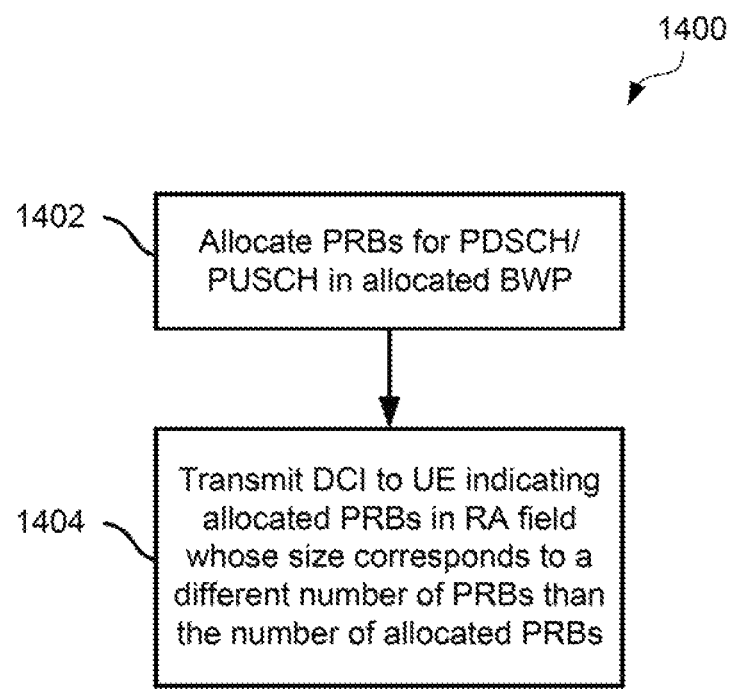
FIG. 14 is a flow diagram showing another example process of allocating frequency-domain resources in a wireless communication system in accordance with some embodiments.

FIG. 14 is a flow diagram showing another example process 1400 of allocating frequency-domain resources in a wireless communication system. Operations in the example process 1400 may be performed by one or more components of a RAN node (e.g., one or more components the baseband circuitry 204 of FIG. 2 in a gNodeB), and, in certain cases, may be encoded in computer-readable media as instructions executable by processing circuitry of at least one processor of a RAN node (e.g., a gNodeB). The example process 1400 may include additional or different operations, and the operations may be performed in the order shown or in another order. In some cases, one or more of the operations shown in FIG. 14 are implemented as processes that include multiple operations, sub-processes, or other types of routines. In some cases, operations can be combined, performed in another order, performed in parallel, iterated, or otherwise repeated or performed another manner.

At 1402, frequency-domain physical resource blocks (PRBs) for physical downlink shared channel (PDSCH) or physical uplink shared channel (PUSCH) transmissions are allocated in an allocated bandwidth part (BWP) for communication between a gNB device and a UE device.

At 1404, second downlink control information (DCI) is encoded for transmission to the UE device. The second DCI indicates the allocated PRBs in a resource allocation (RA) field of the second DCI, wherein a size of the RA field of the DCI corresponds to a different number of PRBs than a number of total PRBs in the allocated BWP. In some instances, the size of the RA field in the DCI is based on a number of PRBs in an initial BWP used for initial communication between the gNB and the UE device. Further, in some instances, the DCI does not include a BWP indicator field (i.e., does not support dynamic BWP switching).

In some cases, the RA field indicates a resource indication value (RIV) indicating a starting PRB and a length indicating a number of contiguous PRBs with the starting PRB that comprise the allocated PRBs. The DCI may include a header bit in the RA field indicating a frequency-domain RA type and a BWP indicator field indicating the allocated BWP for the PDSCH or PUSCH transmissions. The allocated BWP may be different from a BWP previously used for communication between the gNB and the UE device (e.g., in a dynamic BWP switching scenario).

In some instances, the length field of the RIV may be based on a ratio of a number of PRBs in an initial BWP previously used for communication between the gNB and the UE device and the number of allocated PRBs in the allocated BWP. In other instances, the length field of the RIV is based on a number of the allocated PRBs in the allocated BWP and a number of zero-padded bits. In some cases, the RIV includes a subset of bits of the RA field, with the subset of bits comprising N bits, where N=ceil(log_2 (N_RB* (N_RB+1)/2)) and N_RB is the number of PRBs in a current active BWP used for communication between the gNB and the UE device.

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples. The examples listed below may be performed by one or more components of a RAN node (e.g., one or more components the baseband circuitry 204 of FIG. 2 implemented in a gNodeB). In certain cases, may be encoded in computer-readable media as instructions executable by processing circuitry of at least one processor of a RAN node (e.g., a gNodeB).

Example 1 includes an apparatus of a New Radio (NR) gNodeB (gNB) device, the apparatus comprising: memory storing instructions; and processing circuitry coupled to the memory to implement the instructions to: select a resource block group (RBG) size configuration from a set of RBG size configurations based on a bandwidth part (BWP) size, wherein each RBG size configuration indicates RBG sizes associated with respective ranges of BWP sizes, the RBG sizes indicating a number of frequency-domain physical resource blocks (PRBs) for physical downlink shared channel (PDSCH) or physical uplink shared channel (PUSCH) transmissions; allocate PRBs for communication between the gNB and a user equipment (UE) device via the PDSCH or PUSCH transmissions based on the selected RBG size; and encode downlink control information (DCI) that indicates the allocated PRBs for transmission to the UE device.

Example 2 includes the subject matter of Example 1, and optionally, wherein the processing circuitry is further to encode a radio resource control (RRC) message indicating the selected RBG size configuration for transmission to the UE device.

Example 3 includes the subject matter of Example 2, and optionally, wherein the processing circuitry is further to, before encoding the RRC message indicating the selected RBG size, allocate PRBs for communication between the gNB and the UE device based on a default RBG size configuration.

Example 4 includes the subject matter of any one of Examples 1-3, and optionally, wherein the DCI further indicates a number of symbols for the PDSCH or PUSCH transmissions.

Example 5 includes the subject matter of any one of Examples 1-3, and optionally, wherein the processing circuitry is further to select a PDSCH duration from a set of durations that are configured to the UE device based on radio resource control (RRC) messages, and the DCI further indicates the selected PDSCH duration.

Example 6 includes the subject matter of any one of Examples 1-3, and optionally, wherein the RBG size configurations include non-overlapping ranges of BWP sizes.

Example 7 includes the subject matter of any one of Examples 1-3, and optionally, wherein a first RBG size associated with a first range of BWP sizes in a first RBG size configuration is equal to a second RBG size associated with a second range of BWP sizes in the first RBG size configuration.

Example 8 includes the subject matter of any one of Examples 1-3, and optionally, wherein a first RBG size associated with a highest range of BWP sizes in a first RBG size configuration is equal to a second RBG size associated with the highest range of BWP sizes in a second RBG size configuration.

Example 9 includes the subject matter of any one of Examples 1-3, and optionally, wherein the DCI includes a header bit in the resource allocation (RA) field indicating whether frequency-domain allocation of PRBs for the PDSCH or PUSCH transmissions is to be according to NR Type 0 RA or NR Type 1 RA.

Example 10 includes the subject matter of Example 9, and optionally, wherein the RA field indicates NR Type 0 RA, the DCI further includes an RBG size field indicating the selected RBG size, and a bitmap of the RA field indicates which RBGs are assigned for the PDSCH or PUSCH transmissions.

Example 11 includes the subject matter of Example 9, and optionally, wherein the RA field indicates NR Type 0 RA and the DCI further includes one or more of: a BWP field indicating a particular BWP, an RBG size field indicating an RBG size associated with the frequency resources in the particular BWP, and a bitmap in the RA field indicating which RBGs are assigned for the PDSCH or PUSCH transmissions.

Example 12 includes the subject matter of Example 9, and optionally, wherein the RA field indicates NR Type 1 RA and is of a length corresponding to a number of PRBs in the BWP.

Example 13 includes the subject matter of Example 12, and optionally, wherein the length is based on the maximum of ceil(log_2 (N_RB*(N_RB+1)/2)) and ceil(N_RB/RBG_size), where N_RB is the number of PRBs in the BWP and RBG_size is the corresponding RBG size for NR Type 0 RA.

Example 14 includes the subject matter of any one of Examples 1-3, and optionally, wherein allocating PRBs for communication between the gNB and the UE device comprises allocating PRBs for PDSCH and PUSCH that overlap with PRBs allocated for via physical downlink control channel (PDCCH) or physical uplink control channel (PUCCH) transmissions, respectively.

Example 15 includes the subject matter of any one of Examples 1-3, and optionally, wherein allocating PRBs for communication between the gNB and the UE device comprises allocating the PRBs according to NR Type 1 for PUSCH transmissions between the gNB and the UE device using Discrete Fourier Transform-Spread-Orthogonal Frequency Division Multiplexing (DFT-S-OFDM).

Example 16 includes a method to be performed at a processing circuitry of a New Radio (NR) gNodeB (gNB) device, the method comprising: selecting a resource block group (RBG) size configuration from a set of RBG size configurations based on a bandwidth part (BWP) size, wherein each RBG size configuration indicates RBG sizes associated with respective ranges of BWP sizes, the RBG sizes indicating a number of frequency-domain physical resource blocks (PRBs) for physical downlink shared channel (PDSCH) or physical uplink shared channel (PUSCH) transmissions; allocating PRBs for communication between the gNB and a user equipment (UE) device via the PDSCH or PUSCH transmissions based on the selected RBG size; and encoding downlink control information (DCI) that indicates the allocated PRBs for transmission to the UE device.

Example 17 includes the subject matter of Example 16, and optionally, further comprising encoding a radio resource control (RRC) message indicating the selected RBG size configuration for transmission to the UE device.

Example 18 includes the subject matter of Example 17, and optionally, further comprising, before encoding the RRC message indicating the selected RBG size, allocating PRBs for communication between the gNB and the UE device based on a default RBG size configuration.

Example 19 includes the subject matter of Example 16, and optionally, wherein the DCI further indicates a number of symbols for the PDSCH or PUSCH transmissions.

Example 20 includes the subject matter of Example 16, and optionally, further comprising selecting a PDSCH duration from a set of durations that are configured to the UE device based on radio resource control (RRC) messages, and wherein the DCI further indicates the selected PDSCH duration.

Example 21 includes the subject matter of Example 16, and optionally, wherein the RBG size configurations include non-overlapping ranges of BWP sizes.

Example 22 includes the subject matter of Example 16, and optionally, wherein a first RBG size associated with a first range of BWP sizes in a first RBG size configuration is equal to a second RBG size associated with a second range of BWP sizes in the first RBG size configurations.

Example 23 includes the subject matter of Example 16, and optionally, wherein a first RBG size associated with a highest range of BWP sizes in a first RBG size configuration is equal to a second RBG size associated with the highest range of BWP sizes in a second RBG size configurations.

Example 24 includes the subject matter of Example 16, and optionally, wherein the DCI includes a header bit in the resource allocation (RA) field indicating whether frequency-domain allocation of PRBs for the PDSCH or PUSCH transmissions is to be according to NR Type 0 RA or NR Type 1 RA.

Example 25 includes the subject matter of Example 24, and optionally, wherein the RA field indicates NR Type 0 RA, the DCI further includes an RBG size field indicating the selected RBG size, and a bitmap of the RA field indicates which RBGs are assigned for the PDSCH or PUSCH transmissions.

Example 26 includes the subject matter of Example 24, and optionally, wherein the RA field indicates NR Type 0 RA and the DCI further includes one or more of: a BWP field indicating a particular BWP, an RBG size field indicating an RBG size associated with the frequency resources in the particular BWP, and a bitmap in the RA field indicating which RBGs are assigned for the PDSCH or PUSCH transmissions.

Example 27 includes the subject matter of Example 24, and optionally, wherein the RA field indicates NR Type 1 RA and is of a length corresponding to a number of PRBs in the BWP.

Example 28 includes the subject matter of Example 27, and optionally, wherein the length is based on the maximum of ceil(log_2 (N_RB*(N_RB+1)/2)) and ceil(N_RB/RBG_size), where N_RB is the number of PRBs in the BWP and RBG_size is the corresponding RBG size for NR Type 0 RA.

Example 29 includes the subject matter of Example 16, and optionally, wherein allocating PRBs for communication between the gNB and the UE device comprises allocating PRBs for PDSCH and PUSCH that overlap with PRBs allocated for via physical downlink control channel (PDCCH) or physical uplink control channel (PUCCH) transmissions, respectively.

Example 30 includes the subject matter of Example 16, and optionally, wherein allocating PRBs for communication between the gNB and the UE device comprises allocating the PRBs according to NR Type 1 for PUSCH transmissions between the gNB and the UE device using Discrete Fourier Transform-Spread-Orthogonal Frequency Division Multiplexing (DFT-S-OFDM).

Example 31 includes a product comprising one or more tangible computer-readable non-transitory storage media comprising computer-executable instructions operable to, when executed by at least one computer processor, enable the at least one computer processor to: select a resource block group (RBG) size configuration from a set of RBG size configurations based on a bandwidth part (BWP) size, wherein each RBG size configuration indicates RBG sizes associated with respective ranges of BWP sizes, the RBG sizes indicating a number of frequency-domain physical resource blocks (PRBs) for physical downlink shared channel (PDSCH) or physical uplink shared channel (PUSCH) transmissions; allocate PRBs for communication between the gNB and a user equipment (UE) device via the PDSCH or PUSCH transmissions based on the selected RBG size; and encode downlink control information (DCI) that indicates the allocated PRBs for transmission to the UE device.

Example 32 includes the subject matter of Example 31, and optionally, wherein the instructions are further operable enable the at least one computer processor to encode a radio resource control (RRC) message indicating the selected RBG size configuration for transmission to the UE device.

Example 33 includes the subject matter of Example 32, and optionally, wherein the instructions are further operable enable the at least one computer processor to, before encoding the RRC message indicating the selected RBG size, allocate PRBs for communication between the gNB and the UE device based on a default RBG size configuration.

Example 34 includes the subject matter of any one of Examples 31-33, and optionally, wherein the DCI further indicates a number of symbols for the PDSCH or PUSCH transmissions.

Example 35 includes the subject matter of any one of Examples 31-33, and optionally, wherein the instructions are further operable enable the at least one computer processor to select a PDSCH duration from a set of durations that are configured to the UE device based on radio resource control (RRC) messages, and the DCI further indicates the selected PDSCH duration.

Example 36 includes the subject matter of any one of Examples 31-33, and optionally, wherein the RBG size configurations include non-overlapping ranges of BWP sizes.

Example 37 includes the subject matter of any one of Examples 31-33, and optionally, wherein a first RBG size associated with a first range of BWP sizes in a first RBG size configuration is equal to a second RBG size associated with a second range of BWP sizes in the first RBG size configurations.

Example 38 includes the subject matter of any one of Examples 31-33, and optionally, wherein a first RBG size associated with a highest range of BWP sizes in a first RBG size configuration is equal to a second RBG size associated with the highest range of BWP sizes in a second RBG size configurations.

Example 39 includes the subject matter of any one of Examples 31-33, and optionally, wherein the DCI includes a header bit in the resource allocation (RA) field indicating whether frequency-domain allocation of PRBs for the PDSCH or PUSCH transmissions is to be according to NR Type 0 RA or NR Type 1 RA.

Example 40 includes the subject matter of Example 39, and optionally, wherein the RA field indicates NR Type 0 RA, the DCI further includes an RBG size field indicating the selected RBG size, and a bitmap of the RA field indicates which RBGs are assigned for the PDSCH or PUSCH transmissions.

Example 41 includes the subject matter of Example 39, and optionally, wherein the RA field indicates NR Type 0 RA and the DCI further includes one or more of: a BWP field indicating a particular BWP, an RBG size field indicating an RBG size associated with the frequency resources in the particular BWP, and a bitmap in the RA field indicating which RBGs are assigned for the PDSCH or PUSCH transmissions.

Example 42 includes the subject matter of Example 39, and optionally, wherein the RA field indicates NR Type 1 RA and is of a length corresponding to a number of PRBs in the BWP.

Example 43 includes the subject matter of Example 42, and optionally, wherein the length is based on the maximum of ceil(log_2 (N_RB*(N_RB+1)/2)) and ceil(N_RB/RBG_size), where N_RB is the number of PRBs in the BWP and RBG_size is the corresponding RBG size for NR Type 0 RA.

Example 44 includes the subject matter of any one of Examples 31-33, and optionally, wherein allocating PRBs for communication between the gNB and the UE device comprises allocating PRBs for PDSCH and PUSCH that overlap with PRBs allocated for via physical downlink control channel (PDCCH) or physical uplink control channel (PUCCH) transmissions, respectively.

Example 45 includes the subject matter of any one of Examples 31-33, and optionally, wherein allocating PRBs for communication between the gNB and the UE device comprises allocating the PRBs according to NR Type 1 for PUSCH transmissions between the gNB and the UE device using Discrete Fourier Transform-Spread-Orthogonal Frequency Division Multiplexing (DFT-S-OFDM).

Example 46 includes a system comprising: means for selecting a resource block group (RBG) size configuration from a set of RBG size configurations based on a bandwidth part (BWP) size, wherein each RBG size configuration indicates RBG sizes associated with respective ranges of BWP sizes, the RBG sizes indicating a number of frequency-domain physical resource blocks (PRBs) for physical downlink shared channel (PDSCH) or physical uplink shared channel (PUSCH) transmissions; means for allocating PRBs for communication between the gNB and a user equipment (UE) device via the PDSCH or PUSCH transmissions based on the selected RBG size; and means for encoding downlink control information (DCI) that indicates the allocated PRBs for transmission to the UE device.

Example 47 includes the subject matter of Example 46, and optionally, further comprising means for encoding a radio resource control (RRC) message indicating the selected RBG size configuration for transmission to the UE device.

Example 48 includes the subject matter of Example 46, and optionally, further comprising means for selecting a PDSCH duration from a set of durations that are configured to the UE device based on radio resource control (RRC) messages, and the DCI further indicates the selected PDSCH duration Example 49 includes the subject matter of any one of Examples 46-48, and optionally, further comprising means for allocating PRBs for PDSCH and PUSCH that overlap with PRBs allocated for via physical downlink control channel (PDCCH) or physical uplink control channel (PUCCH) transmissions, respectively.

Example 50 includes the subject matter of any one of Examples 46-48, and optionally, further comprising means for allocating the PRBs according to NR Type 1 for PUSCH transmissions between the gNB and the UE device using Discrete Fourier Transform-Spread-Orthogonal Frequency Division Multiplexing (DFT-S-OFDM)

Example 51 includes an apparatus of a New Radio (NR) gNodeB (gNB) device, the apparatus comprising: memory storing instructions; and processing circuitry coupled to the memory to implement the instructions to: allocate frequency-domain physical resource blocks (PRBs) for physical downlink shared channel (PDSCH) or physical uplink shared channel (PUSCH) transmissions in an allocated bandwidth part (BWP) for communication between the gNB and a user equipment (UE) device; and encode, for transmission to the UE device, second downlink control information (DCI) that indicates the allocated PRBs in a resource allocation (RA) field of the second DCI, wherein a size of the RA field of the DCI corresponds to a different number of PRBs than a number of total PRBs in the allocated BWP.

Example 52 includes the subject matter of Example 51, and optionally, wherein the RA field indicates a resource indication value (RIV) indicating a starting PRB and a length indicating a number of contiguous PRBs with the starting PRB that comprise the allocated PRBs.

Example 53 includes the subject matter of Example 52, and optionally, wherein the DCI includes a header bit in the RA field indicating a frequency-domain RA type and a BWP indicator field indicating the allocated BWP for the PDSCH or PUSCH transmissions.

Example 54 includes the subject matter of Example 53, and optionally, wherein the allocated BWP is different from a BWP previously used for communication between the gNB and the UE device.

Example 55 includes the subject matter of Example 52, and optionally, wherein the length is based on a ratio of a number of PRBs in an initial BWP previously used for communication between the gNB and the UE device and the number of total PRBs in the allocated BWP.

Example 56 includes the subject matter of Example 52, and optionally, wherein the length is based on a number of the allocated PRBs in the allocated BWP and a number of zero-padded bits.

Example 57 includes the subject matter of Example 52, and optionally, wherein the RIV comprises a subset of bits of the RA field, the subset comprising N bits, where N=ceil($\log_2 (N\_RB*(N\_RB+1)/2)$) and N_RB is the number of PRBs in a current active BWP used for communication between the gNB and the UE device.

Example 58 includes the subject matter of any one of Examples 51-57, and optionally, wherein the size of the RA field in the DCI is based on a number of PRBs in an initial BWP used for initial communication between the gNB and the UE device.

Example 59 includes the subject matter of Example 58, and optionally, wherein the DCI does not include a BWP indicator field.

Example 60 includes method to be performed at a processing circuitry of a New Radio (NR) gNodeB (gNB) device, the method comprising: allocating frequency-domain physical resource blocks (PRBs) for physical downlink shared channel (PDSCH) or physical uplink shared channel (PUSCH) transmissions in an allocated bandwidth part (BWP) for communication between the gNB and a user equipment (UE) device; and encoding, for transmission to the UE device, second downlink control information (DCI) that indicates the allocated PRBs in a resource allocation (RA) field of the second DCI, wherein a size of the RA field of the DCI corresponds to a different number of PRBs than a number of total PRBs in the allocated BWP.

Example 61 includes the subject matter of Example 60, and optionally, wherein the RA field indicates a resource indication value (RIV) indicating a starting PRB and a length indicating a number of contiguous PRBs with the starting PRB that comprise the allocated PRBs.

Example 62 includes the subject matter of Example 61, and optionally, wherein the DCI includes a header bit in the RA field indicating a frequency-domain RA type and a BWP indicator field indicating the allocated BWP for the PDSCH or PUSCH transmissions.

Example 63 includes the subject matter of Example 62, and optionally, wherein the allocated BWP is different from a BWP previously used for communication between the gNB and the UE device.

Example 64 includes the subject matter any one of Examples 61-63, and optionally, wherein the length is based on a ratio of a number of PRBs in an initial BWP previously used for communication between the gNB and the UE device and the number of allocated PRBs in the allocated BWP.

Example 65 includes the subject matter any one of Examples 61-63, and optionally, wherein the length is based on a number of the allocated PRBs in the allocated BWP and a number of zero-padded bits.

Example 66 includes the subject matter any one of Examples 61-63, and optionally, wherein the RIV comprises a subset of bits of the RA field, the subset comprising N bits, where N=ceil($\log_2 (N\_RB*(N\_RB+1)/2)$) and N_RB is the number of PRBs in a current active BWP used for communication between the gNB and the UE device.

Example 67 includes the subject matter of Example 60, and optionally, wherein the size of the RA field in the DCI is based on a number of PRBs in an initial BWP used for initial communication between the gNB and the UE device.

Example 68 includes the subject matter of Example 67, and optionally, wherein the DCI does not include a BWP indicator field.

Example 69 includes a product comprising one or more tangible computer-readable non-transitory storage media comprising computer-executable instructions operable to, when executed by at least one computer processor, enable the at least one computer processor to: allocate frequency-domain physical resource blocks (PRBs) for physical downlink shared channel (PDSCH) or physical uplink shared channel (PUSCH) transmissions in an allocated bandwidth part (BWP) for communication between the gNB and a user equipment (UE) device; and encode, for transmission to the UE device, second downlink control information (DCI) that indicates the allocated PRBs in a resource allocation (RA) field of the second DCI, wherein a size of the RA field of the DCI corresponds to a different number of PRBs than a number of total PRBs in the allocated BWP.

Example 70 includes the subject matter of Example 69, and optionally, wherein the RA field indicates a resource indication value (RIV) indicating a starting PRB and a length indicating a number of contiguous PRBs with the starting PRB that comprise the allocated PRBs.

Example 71 includes the subject matter of Example 70, and optionally, wherein the DCI includes a header bit in the RA field indicating a frequency-domain RA type and a BWP indicator field indicating the allocated BWP for the PDSCH or PUSCH transmissions.

Example 72 includes the subject matter of Example 71, and optionally, wherein the allocated BWP is different from a BWP previously used for communication between the gNB and the UE device.

Example 73 includes the subject matter of any one of Examples 70-72, and optionally, wherein the length is based on a ratio of a number of PRBs in an initial BWP previously used for communication between the gNB and the UE device and the number of allocated PRBs in the allocated BWP.

Example 74 includes the subject matter of any one of Examples 70-72, and optionally, wherein the length is based on a number of the allocated PRBs in the allocated BWP and a number of zero-padded bits.

Example 75 includes the subject matter of any one of Examples 70-72, and optionally, wherein the RIV comprises a subset of bits of the RA field, the subset comprising N bits, where N=ceil(log_2 (N_RB*(N_RB+1)/2)) and N_RB is the number of PRBs in a current active BWP used for communication between the gNB and the UE device.

Example 76 includes the subject matter of Example 69, and optionally, wherein the size of the RA field in the DCI is based on a number of PRBs in an initial BWP used for initial communication between the gNB and the UE device.

Example 77 includes the subject matter of Example 76, and optionally, wherein the DCI does not include a BWP indicator field.

Example 78 includes a system comprising: means for allocating frequency-domain physical resource blocks (PRBs) for physical downlink shared channel (PDSCH) or physical uplink shared channel (PUSCH) transmissions in an allocated bandwidth part (BWP) for communication between the gNB and a user equipment (UE) device; and means for encoding, for transmission to the UE device, second downlink control information (DCI) that indicates the allocated PRBs in a resource allocation (RA) field of the second DCI, wherein a size of the RA field of the DCI corresponds to a different number of PRBs than a number of total PRBs in the allocated BWP.

Example 79 may include a system or method of wireless communication for a fifth generation (5G) or new radio (NR) system wherein frequency-domain resource allocation for downlink (DL) and uplink (UL) shared channels, PDSCH and PUSCH, is indicated to a NR UE using different resource allocation types using a combination of one or more of predefined mapping rules, higher layer signaling, and Layer 1 signaling.

Example 80 may include the system or method of Example 79 or some other example herein, wherein the frequency-domain resource allocation for PDSCH and PUSCH with CP-OFDM waveform is signaled by dividing the allocable PRBs within the carrier BW, configured frequency range, or activated BWP(s), etc. into Resource Block Groups (RBGs) of size P, with possibly the last RBG containing less than P PRBs and wherein the signaling for the resource allocation is realized via a bitmap of length ceil(N/P) where N is the number of PRBs within the carrier BW, configured frequency range, or BWP.

Example 81 may include the system or method of Example 80 or some other example herein, wherein for carrier BW, configured frequency range, or BWP sizes of less than 'X' PRBs the RBG sizes may be configured via higher layers between one of multiple candidate RBG values.

Example 82 may include the system or method of Example 80 or some other example herein, wherein the RBG value is configured for transmission of all PDSCH and PUSCH transmissions with CP-OFDM via the minimum system information (MSI), remaining minimum system information (RMSI), or system information block (SIB) signaling.

Example 83 may include the system or method of Example 80 or some other example herein, wherein the RBG value is indicated dynamically to the UE such that the RBG value is indicated via the scheduling DCI out of a plurality of RBG values by means of a flag field.

Example 84 may include the system or method of Example 83 or some other example herein, wherein an additional shift indicator field is used to indicate the set of RBGs that the resource allocation bitmap field corresponds to and such that the union of all sets of RBGs indicated by the shift indicator field covers all allocable PRBs in the carrier BW, configured frequency range, or bandwidth part.

Example 85 may include the system or method of Example 80 or some other example herein, wherein the size of RBG is obtained by scaling a reference RBG size by a certain factor greater than one, when the number of allocated symbols is less than a certain configured or specified threshold, and wherein the factor is either predefined or configured or dynamically indicated to the UE.

Example 86 may include the system or method of Example 80 or some other example herein, wherein the size of RBG can be scaled by a factor that is given by the ratio of the number of allocated symbols for the PDSCH or PUSCH with at least CP-OFDM waveform and a reference number of symbols.

Example 87 may include the system or method of Example 80 or some other example herein, wherein the DL resource allocation (RA) type 0 and type 1 are supported for frequency-domain resource allocation for PDSCH and PUSCH with at least CP-OFDM waveform and a RA type header is used to indicate the RA type.

Example 88 may include the system or method of Example 80 or some other example herein, wherein the DL resource allocation (RA) type 0 and type 2 are supported for frequency-domain resource allocation for PDSCH and PUSCH with at least CP-OFDM waveform and a RA type header is used to indicate the RA type.

Example 89 may include the system or method of Example 80 or some other example herein, wherein the DL resource allocation (RA) type 0 is supported and in order to support narrowband resource allocations smaller than the configured/indicated RBG size, the frequency-domain resource allocation field is reinterpreted.

Example 90 may include the system or method of example 89 or some other example herein, wherein ceil(log 2(ceil(N/P))) LSB (or MSB) bits are used to indicate one of the ceil(N/P) RBGs, the subsequent ceil(log 2(P*(P+1)/2)) bits are used to indicate the PRBs allocated with the indicated RBG of size P PRBs following a mechanism similar to LTE DL RA type 2, and any remaining bits from the original resource allocation field corresponding to DL RA type 0 (depending on the carrier BW or BWP size) are reserved or used for jointly indicating any other dynamic signaling.

Example 91 may include the system or method of example 89 or some other example herein, wherein ceil(log 2(ceil(N/P))) LSB (or MSB) bits are used to indicate one of the ceil(N/P) RBGs, the subsequent P bits are used as a bitmap to indicate the PRBs allocated with the indicated RBG of size P PRBs, and any remaining bits from the original resource allocation field corresponding to DL RA type 0 (depending on the carrier BW or BWP size) are reserved or used for jointly indicating any other dynamic signaling.

Example 92 may include the system or method of example 89 or some other example herein, wherein the RBGs are further grouped by grouping of 'x' contiguous or non-contiguous RBGs, and a bitmap of length ceil(ceil(N/P)/x) is used to indicate a set of allocated RBG sets, and the PRBs within each RBG set are indicated using DL RA type 2 using ceil(log 2(xP*(xP+1)/2) bits.

Example 93 may include the system or method of Example 80 or some other example herein, wherein for scheduling a UE with an allocation spanning multiple non-overlapping BWPs, the resource allocation in frequency-domain may be indicated using an RBG size corresponding to the sum of the PRBs corresponding to the aggregated BWPs.

Example 94 may include the system or method of Example 80 or some other example herein, wherein for scheduling a UE with an allocation spanning multiple overlapping (partially or one completely including the other) BWPs, the resource allocation in frequency-domain may be indicated using an RBG size corresponding to the bandwidth of the union of the span of these multiple BWPs.

Example 95 may include the system or method of Example 80 or some other example herein, wherein for scheduling a UE with an allocation spanning multiple non-overlapping or overlapping BWPs, different DC's may be used to schedule the respective transport blocks (TBs) corresponding to same or different numerologies, and the frequency-domain resource allocation uses the RBG size corresponding to the respective BWP.

Example 96 may include the system or method of Example 80 or some other example herein, wherein frequency-domain resource allocation information in a downlink control information or in the higher layers is conveyed to the UE using multiple fields or wherein some of the fields are jointly encoded.

Example 97 may include the system or method of example 96 or some other example herein, wherein a first field indicates a type of resource allocation such as RBG based allocation or startPRB-length (or similar), a second field indicates the RBG size (e.g. in case field A indicates an RBG based allocation), and a third indicates a bitmap (or similar) of which RBGs are assigned.

Example 98 may include the system or method of example 96 or some other example herein, wherein a first field indicates a type of resource allocation such as RBG based allocation or startPRB-length (or similar), a second field indicates a BWP, a third field indicates the RBG size (e.g. in case field A indicates an RBG based allocation), and a fourth field indicates a bitmap (or similar) of which RBGs are assigned.

Example 99 may include the system or method of Example 80 or some other example herein, wherein resource allocation field may be interpreted differently based on at least one or more of the following to determine the RBG size: a first RBG size for a first set of messages, and a second RBG size for a second set of messages; a first RBG size for message scheduled in a first CORESET, and a second RBG size for messages scheduled via a second CORESET; a first RBG size for a first DCI type, and a second RBG size for a second DCI type.

Example 100 may include the system or method of example 79 or some other example herein, wherein frequency-domain resource allocation for PUSCH with DFT-S-OFDM is indicated to the UE following LTE UL RA type 0 (or equivalently, LTE DL RA type 2) or similar.

Example 101 may include an apparatus comprising means to perform one or more elements of a method described in or related to any of examples 79-100, or any other method or process described herein.

Example 102 may include one or more non-transitory computer-readable media comprising instructions to cause an electronic device, upon execution of the instructions by one or more processors of the electronic device, to perform one or more elements of a method described in or related to any of examples 79-100, or any other method or process described herein.

Example 103 may include an apparatus comprising logic, modules, or circuitry to perform one or more elements of a method described in or related to any of examples 79-100, or any other method or process described herein.

Example 104 may include a method, technique, or process as described in or related to any of examples 79-100, or portions or parts thereof.

Example 105 may include an apparatus comprising: one or more processors and one or more computer readable media comprising instructions that, when executed by the one or more processors, cause the one or more processors to perform the method, techniques, or process as described in or related to any of examples 79-100, or portions thereof.

Example 106 may include a signal as described in or related to any of examples 79-100, or portions or parts thereof.

Example 107 may include the system and method of wireless communication for a fifth generation (5G) or new radio (NR) system with one or more of the following components: (a) Wherein a fallback DL or UL DCI format using DL/UL Type 1 RA (RIV based RA) can schedule resources in DL/UL BWPs that may not have same size as the number of PRBs corresponding to the RA bit-field in the DCI; (b) Wherein DL/UL Type 1 RA (RIV based RA) can schedule DL/UL resources with support of dynamic BWP switching; or (c) Wherein only DL Type 1 RA is used for scheduling of all common control messages in DL and only UL Type 1 RA for Msg3 retransmission scheduling.

Example 108 may include the system and method of example 107 or some other example herein, wherein fallback DL DCI can assign PDSCH resources only in the active DL BWP in which the DCI is detected.

Example 109 may include the system and method of example 107 or some other example herein, wherein for fallback UL DCI, the allocated PUSCH resources is limited to the initial or default active UL BWP or in the latest active UL BWP.

Example 110 may include the system and method of example 107 or some other example herein, wherein the Type 1 RA bit-field can be of length corresponding to number of PRBs in the default/initial DL or UL BWP.

Example 111 may include the system and method of example 107 or some other example herein, wherein for Type 1 RA bit-field in non-fallback DCI, the bit-width is determined according to the largest of the DL and UL BWPs configured to the UE.

Example 112 may include the system and method of wireless communication for a fifth generation (5G) or new radio (NR) system with one or more of the following components: (a) Wherein UL Type 0 RA (RBG based RA) supports dynamic UL BWP switching such that the Type 0

RA bitmap size is determined based on the last active UL BWP and in case of BWP switching indication from the DCI, the resource allocation is performed using a scaled version of the RBG value used for the latest active UL BWP; (b) Wherein two sets of RBG sizes are specified for DL/UL Type 0 RA such that the two sets have the lowest PRB ranges with same RBG sizes; or (a) Wherein two sets of RBG sizes are specified for DL/UL Type 0 RA such that a particular set can have multiple consecutive rows for different non-overlapping PRB ranges with same RBG size value.

Example 113 may include an apparatus comprising means to perform one or more elements of a method described in or related to any of examples 107-112, or any other method or process described herein.

Example 114 may include one or more non-transitory computer-readable media comprising instructions to cause an electronic device, upon execution of the instructions by one or more processors of the electronic device, to perform one or more elements of a method described in or related to any of examples 107-112, or any other method or process described herein.

Example 115 may include an apparatus comprising logic, modules, or circuitry to perform one or more elements of a method described in or related to any of examples 107-112, or any other method or process described herein.

Example 116 may include a method, technique, or process as described in or related to any of examples 107-112, or portions or parts thereof.

Example 117 may include an apparatus comprising: one or more processors and one or more computer readable media comprising instructions that, when executed by the one or more processors, cause the one or more processors to perform the method, techniques, or process as described in or related to any of examples 107-112, or portions thereof.

Example 118 may include a signal as described in or related to any of examples 107-112, or portions or parts thereof.

Example 13 may include a signal in a wireless network as shown and described herein.

Example 119 may include a method of communicating in a wireless network as shown and described herein.

Example 120 may include a system for providing wireless communication as shown and described herein.

Example 121 may include a device for providing wireless communication as shown and described herein.

Example 122 includes an apparatus of a user equipment (UE) device that includes instructions that, when executed by processing circuitry of the UE device, process messaging from a gNodeB (gNB) device indicating frequency-domain resource allocation according to any one of Examples 1-121, and configure the UE device to communicate with the gNB based on the frequency-domain resource allocation.

Example 123 includes a method comprising: processing, at a UE device messaging from a gNB device indicating frequency-domain resource allocation according to any one of Examples 1-121, and configuring the UE device to communicate with the gNB based on the frequency-domain resource allocation.

Example 124 includes product comprising one or more tangible computer-readable non-transitory storage media comprising computer-executable instructions operable to, when executed by at least one computer processor, enable the at least one computer processor to: process messaging from a gNodeB (gNB) device indicating frequency-domain resource allocation according to any one of Examples 1-121, and configure a UE device to communicate with the gNB based on the frequency-domain resource allocation.

Example 125 includes the subject matter of Example 1, and optionally, further comprising a front-end module coupled to the processing circuitry.

Example 126 includes the subject matter of Example 125, and optionally, further comprising at least one antenna coupled to the front-end module.

Example 127 includes the subject matter of Example 51, and optionally, further comprising a front-end module coupled to the processing circuitry.

Example 128 includes the subject matter of Example 127, and optionally, further comprising at least one antenna coupled to the front-end module.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a base station, the apparatus including a radio frequency (RF) circuitry interface, and one or more processors coupled to the RF circuitry interface and configured to:
   determine a resource allocation (RA) type for resource allocation in a physical downlink shared channel (PDSCH) transmission to or a physical uplink shared channel (PUSCH) transmission from a User Equipment (UE), the resource allocation corresponding to physical resource blocks (PRBs) of the PDSCH transmission or the PUSCH transmission; and
   encode, for transmission to the UE, downlink control information (DCI) indicating information on the resource allocation including information on the PRBs;
   wherein the RA type is one of a RA type 0 corresponding to a resource block group (RBG)-based resource allocation, or a RA type 1 corresponding to a resource indication value (RIV)-based resource allocation;
   wherein the information on the PRBs in the DCI includes, for RA type 0, a bitmap of RBGs corresponding to the PRBs, and, for RA type 1, an indication of a starting virtual resource allocation and a length of virtual resource allocations corresponding to the PRBs;
   wherein, for RA type 0, a size of each of the RBGs corresponding to the PRBs is based on a range of bandwidth part (BWP) sizes including a size of a BWP associated with the RBGs; and
   wherein the DCI includes a field to indicate a cross-BWP dynamic switch from an active BWP to the BWP associated with the RBGs.

2. The apparatus of claim 1, wherein, for RA type 0, for a range of BWP sizes having a value less than or equal to 26, a size of each of the RBGs is 2, for a range of BWP sizes having a value of 37 to 63, the size of each of the RBGs is 4, for a range of BWP sizes having a value of 73 to 138, the size of each of the RBGs is 8, and for a range of BWP sizes having a value of 145 to 275, the size of each of the RBGs is 16.

3. The apparatus of claim 1, wherein the DCI includes a plurality of fields to indicate the information on the resource allocation, the plurality of fields including:
   a field to indicate the RA type;
   a field to indicate the BWP associated with the RBGs; and
   a field to indicate the resource allocation.

4. The apparatus of claim 1, wherein, for RA type 1, a length in bits for the information on the resource allocation in the DCI is a function of ceil(log_2(N_RB*(N_RB+1)/2)), where N_RB is a number of PRBs in the BWP associated with the RBGs, where ceil refers to a ceiling function.

5. The apparatus of claim 1, further comprising a front-end module coupled to the one or more processors.

6. The apparatus of claim 5, further comprising at least one antenna coupled to the front-end module.

7. A product comprising one or more tangible computer-readable non-transitory storage media comprising computer-executable instructions operable to, when executed by at least one computer processor, enable the at least one computer processor to perform operations including:
  determining a resource allocation (RA) type for resource allocation in a physical downlink shared channel (PDSCH) transmission to or a physical uplink shared channel (PUSCH) transmission from a User Equipment (UE), the resource allocation corresponding to physical resource blocks (PRBs) of the PDSCH transmission or the PUSCH transmission; and
  encoding, for transmission to the UE, downlink control information (DCI) indicating information on the resource allocation including information on the PRBs;
  wherein the RA type is one of a RA type 0 corresponding to a resource block group (RBG)-based resource allocation, or a RA type 1 corresponding to a resource indication value (RIV)-based resource allocation;
  wherein the information on the PRBs in the DCI includes, for RA type 0, a bitmap of RBGs corresponding to the PRBs, and, for RA type 1, an indication of a starting virtual resource allocation and a length of virtual resource allocations corresponding to the PRBs;
  wherein, for RA type 0, a size of each of the RBGs corresponding to the PRBs is based on a range of bandwidth part (BWP) sizes including a size of a BWP associated with the RBGs; and
  wherein the DCI includes a field to indicate a cross-BWP dynamic switch from an active BWP to the BWP associated with the RBGs.

8. The product of claim 7, wherein, for RA type 0, for a range of BWP sizes having a value less than or equal to 26, a size of each of the RBGs is 2, for a range of BWP sizes having a value of 37 to 63, the size of each of the RBGs is 4, for a range of BWP sizes having a value of 73 to 138, the size of each of the RBGs is 8, and for a range of BWP sizes having a value of 145 to 275, the size of each of the RBGs is 16.

9. The product of claim 7, wherein the DCI includes a plurality of fields to indicate the information on the resource allocation, the plurality of fields including:
  a field to indicate the RA type;
  a field to indicate the BWP associated with the RBGs; and
  a field to indicate the resource allocation.

10. The product of claim 7, wherein, for RA type 1, a length in bits for the information on the resource allocation in the DCI is a function of ceil(log_2(N_RB*(N_RB+1)/2)), where N_RB is a number of PRBs in the BWP associated with the RBGs, where ceil refers to a ceiling function.

11. An apparatus of a User Equipment (UE), the apparatus including a radio frequency (RF) circuitry interface, and one or more processors coupled to the RF circuitry interface and configured to:
  decode a downlink control information (DCI) from a base station indicating information on a resource allocation in a physical downlink shared channel (PDSCH) transmission from the base station to the UE or a physical uplink shared channel (PUSCH) transmission from the UE to the base station, the resource allocation corresponding to physical resource blocks (PRBs) of the PDSCH transmission or the PUSCH transmission;
  determine a resource allocation (RA) type for the resource allocation from the DCI; and
  decode the PDSCH transmission or encode the PUSCH transmission based on the RA type;
  wherein the RA type is one of a RA type 0 corresponding to a resource block group (RBG)-based resource allocation, or a RA type 1 corresponding to a resource indication value (RIV)-based resource allocation;
  wherein the information on the PRBs in the DCI includes, for RA type 0, a bitmap of RBGs corresponding to the PRBs, and, for RA type 1, an indication of a starting virtual resource allocation and a length of virtual resource allocations corresponding to the PRBs;
  wherein, for RA type 0, a size of each of the RBGs corresponding to the PRBs is based on a range of bandwidth part (BWP) sizes including a size of a BWP associated with the RBGs;
  wherein the DCI includes a field to indicate a cross-BWP dynamic switch from an active BWP to the BWP associated with the RBGs; and
  wherein the one or more processors are to decode the DCI to determine the PDSCH transmission or the PUSCH transmission involves a cross-BWP switch.

12. The apparatus of claim 11, wherein:
  the DCI includes a plurality of fields to indicate the information on the resource allocation, the plurality of fields including a field to indicate the RA type, a field to indicate the BWP associated with the RBGs, and a field to indicate the resource allocation; and
  the one or more processors are to decode the DCI to determine the RA type, the BWP associated with the RBGs, and the resource allocation based on the plurality of fields.

13. The apparatus of claim 11, further comprising a front-end module coupled to the one or more processors.

14. The apparatus of claim 13, further comprising at least one antenna coupled to the front-end module.

15. A method to be performed at a processing circuitry of a User Equipment (UE) device, the method including:
  decoding a downlink control information (DCI) from a base station indicating information on a resource allocation in a physical downlink shared channel (PDSCH) transmission from the base station to a User Equipment (UE) or a physical uplink shared channel (PUSCH) transmission from the UE to the base station, the resource allocation corresponding to physical resource blocks (PRBs) of the PDSCH transmission or the PUSCH transmission;
  determining a resource allocation (RA) type for the resource allocation from the DCI; and
  decoding the PDSCH transmission or encoding the PUSCH transmission based on the RA type;
  wherein the RA type is one of a RA type 0 corresponding to a resource block group (RBG)-based resource allocation, or a RA type 1 corresponding to a resource indication value (RIV)-based resource allocation;
  wherein the information on the PRBs in the DCI includes, for RA type 0, a bitmap of RBGs corresponding to the PRBs, and, for RA type 1, an indication of a starting virtual resource allocation and a length of virtual resource allocations corresponding to the PRBs;
  wherein, for RA type 0, a size of each of the RBGs corresponding to the PRBs is based on a range of bandwidth part (BWP) sizes including a size of a BWP associated with the RBGs; and wherein the DCI includes a field to indicate a cross-BWP dynamic switch from an active BWP to the BWP associated with the RBGs.

16. The method of claim 15, wherein:
the DCI includes a plurality of fields to indicate the information on the resource allocation, the plurality of fields including a field to indicate the RA type, a field to indicate the BWP associated with the RBGs, and a field to indicate the resource allocation; and
the method including decoding the DCI to determine the RA type, the BWP associated with the RBGs, and the resource allocation based on the plurality of fields.

17. The method of claim 15, wherein the DCI includes a plurality of fields to indicate the information on the resource allocation, the plurality of fields including:
a field to indicate the RA type;
a field to indicate the BWP associated with the RBGs; and
a field to indicate the resource allocation.

18. The method of claim 15, wherein, for RA type 1, a length in bits for the information on the resource allocation in the DCI is a function of ceil(log_2(N_RB*(N_RB+1)/2)), where N_RB is a number of PRBs in the BWP associated with the RBGs, where ceil refers to a ceiling function.

19. The apparatus of claim 1, wherein, for RA type 0, for a first range of BWP sizes spanning a first value to a second value, a size of each of the RBGs is 2, for a second range of BWP sizes spanning the second value plus one to a third value, the size of each of the RBGs is 4, for a third range of BWP sizes spanning the third value plus one to a fourth value, the size of each of the RBGs is 8, and for a fourth range of BWP sizes spanning the fourth value plus one to a fifth value, the size of each of the RBGs is 16, and wherein the first, second, third, and fourth ranges are non-overlapping.

20. The apparatus according to claim 19, wherein the first value is one and the fifth value is 275.

21. The product of claim 7, wherein, for RA type 0, for a first range of BWP sizes, a size of each of the RBGs is 2, for a second range of BWP sizes, the size of each of the RBGs is 4, for a third range of BWP sizes, the size of each of the RBGs is 8, and for a fourth range of BWP sizes, the size of each of the RBGs is 16, wherein the first, second, third, and fourth ranges are non-overlapping, and wherein the first range begins at one and the fourth range ends at 275.

22. The apparatus of claim 11, further comprising:
receiving a parameter from the base station via radio resource control (RRC) signaling, wherein the parameter has only two possible values, which respectively indicate a first RBG size configuration and a second RBG size configuration, and wherein each of the first and second RBG size configurations comprises a plurality of ranges of BWP sizes, each associated with a different RBG size; and
selecting the range of BWP sizes from amongst the plurality of ranges of BWP sizes for an RBG size configuration indicated by the parameter, and wherein the size of each of the RBGs corresponding to the PRBs is the different RBG size for the selected range of BWP sizes.

* * * * *